United States Patent
Winslow et al.

(10) Patent No.: US 11,008,810 B2
(45) Date of Patent: May 18, 2021

(54) STEERING A DRILL BIT WITH A ROTARY VALVE

(71) Applicant: HALLIBURTON ENERGY SERVICES, INC., Houston, TX (US)

(72) Inventors: Daniel Winslow, Spring, TX (US); Larry Chambers, Kingwood, TX (US); Neelesh Deolalikar, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 42 days.

(21) Appl. No.: 16/342,188

(22) PCT Filed: Jul. 17, 2017

(86) PCT No.: PCT/US2017/042354
§ 371 (c)(1),
(2) Date: Apr. 15, 2019

(87) PCT Pub. No.: WO2018/075110
PCT Pub. Date: Apr. 26, 2018

(65) Prior Publication Data
US 2019/0249494 A1   Aug. 15, 2019

Related U.S. Application Data

(60) Provisional application No. 62/410,268, filed on Oct. 19, 2016.

(51) Int. Cl.
*F16K 3/08* (2006.01)
*F16K 11/07* (2006.01)
(Continued)

(52) U.S. Cl.
CPC ............... *E21B 7/068* (2013.01); *B23H 9/00* (2013.01); *B23K 1/0008* (2013.01);
(Continued)

(58) Field of Classification Search
CPC .... F16K 11/06; F16K 11/065; F16K 11/0655; F16K 11/07; F16K 11/0716; F16K 3/08; F16K 3/06; F16K 3/085
See application file for complete search history.

(56) References Cited

U.S. PATENT DOCUMENTS 5,520,255 A * 5/1996 Barr ................... E21B 4/003
                                                      175/24
5,706,905 A * 1/1998 Barr ................... E21B 7/06
                                                      175/61
(Continued)

FOREIGN PATENT DOCUMENTS

GB    2423102 A    8/2006
GB    2486811 A    6/2012

OTHER PUBLICATIONS

European Patent Office, Supplementary European Search Report, Application No. EP 17862871, dated Apr. 30, 2020, 7 pages, Europe.

(Continued)

*Primary Examiner* — Kenneth L Thompson

(57) ABSTRACT

A rotary valve can include a housing, a manifold with multiple flow paths can be fixedly mounted to the housing. A rotary actuator with a first surface can be rotatably mounted within the housing, and a valve seat with a second surface can be fixedly attached to the manifold, where the second surface can sealingly engage the first surface. The rotary actuator can include a gap that selectively aligns with respective ones of valve seat ports as the rotary actuator rotates relative to the valve seat, thereby selectively pressurizing one or more actuators. A system and method can include a rotary valve that selectively causes pads to extend at a predetermined orientation in the wellbore to steer a drill bit. The azimuthal orientation of a rotary actuator of the (Continued)

valve can determine which pads are extended and which are retracted as the drill bit rotates.

21 Claims, 17 Drawing Sheets

(51) Int. Cl.
    *E21B 7/06*     (2006.01)
    *F16K 11/074*     (2006.01)
    *F16K 31/04*     (2006.01)
    *B23H 9/00*     (2006.01)
    *B23K 1/00*     (2006.01)
    *B23P 15/00*     (2006.01)
    *E21B 34/06*     (2006.01)

(52) U.S. Cl.
    CPC ............ *B23P 15/001* (2013.01); *E21B 34/06* (2013.01); *F16K 11/074* (2013.01); *F16K 31/041* (2013.01)

(56) References Cited

U.S. PATENT DOCUMENTS

| | | | |
|---|---|---|---|
| 5,803,185 A * | 9/1998 | Barr ........................ | E21B 47/22 175/45 |
| 6,447,852 B1 | 9/2002 | Gordeev et al. | |
| 6,467,557 B1 | 10/2002 | Krueger | |
| 6,962,214 B2 | 11/2005 | Hughes et al. | |
| 7,849,936 B2 * | 12/2010 | Hutton ................... | E21B 7/064 175/61 |
| 8,141,657 B2 * | 3/2012 | Hutton ..................... | E21B 7/06 175/61 |
| 8,708,064 B2 * | 4/2014 | Downton ................ | E21B 7/062 175/61 |
| 9,010,370 B2 | 4/2015 | Isenhour et al. | |
| 9,035,788 B2 * | 5/2015 | Downton ................ | E21B 47/20 340/853.3 |
| 9,121,223 B2 * | 9/2015 | Niina ................... | F16K 11/0746 |
| 10,633,925 B2 * | 4/2020 | Panda ................... | F16K 11/074 |
| 2004/0094216 A1 | 5/2004 | Wagner | |
| 2007/0221409 A1 | 9/2007 | Hall et al. | |
| 2007/0221412 A1 | 9/2007 | Hall et al. | |
| 2009/0224193 A1 | 9/2009 | Dopf et al. | |
| 2012/0103593 A1 | 5/2012 | Hall | |
| 2012/0160565 A1 | 6/2012 | Downton et al. | |
| 2014/0014866 A1 | 1/2014 | Isenhour | |
| 2015/0337601 A1 | 11/2015 | Niina et al. | |
| 2016/0002992 A1 | 1/2016 | Rushton | |
| 2016/0084007 A1 | 3/2016 | Sugiura | |
| 2016/0177664 A1 | 6/2016 | Kelly | |

OTHER PUBLICATIONS

European Patent Office, Supplementary European Search Report, Application No. EP 17861278, dated Feb. 12, 2020, 9 pages, Europe.

Korean Intellecutal Property Office, PCT/US2017/042354, International Search Report and Written Opinion, dated Sep. 22, 2017, 12 pages, Korea.

Korean Intellecutal Property Office, PCT/US2017/042350, International Search Report and Written Opinion, dated Nov. 10, 2017, 22 pages, Korea.

\* cited by examiner

| Property | Description | Polycrystalline Diamond (PCD) | Silicon Carbide Diamond (ScD) | Tungsten Carbide (WC) |
|---|---|---|---|---|
| Composition | Diamond Content (% vol) | 85–95 | 80 | 0 |
| Density | (g/cm$^3$) | 3.9–4.1 | 3.42 | 12–15 |
| Stiffness | Elastic Modulus (GPa) | 850–1,150 | 1,050 | 450–650 |
| Strength | Transverse Rupture Strength (GPa) | 0.9–1.7 | 0.8 | 3.2–4.4 |
| | Compressive Strength (GPa) | 4.4 | 4.0 | — |
| Hardness | Knoop Hardness (3kg load) (kg/mm$^2$) | > 4,000 | 4,000 | 800–1,500 |
| Heat Transfer | Thermal Conductivity (W/mK) | 500–600 | 350 | 100 |
| | CTE | 1×10$^{-6}$ at room temp | 1×10$^{-6}$ at room temp 4×10$^{-6}$ at 1000°C | 4.5×10$^{-6}$ at room temp |
| Fracture Toughness | Notched Beam (MPa√m) | PCD 10.5 Solid PCBN 5.2 | 9.5 | 15 |

*FIG. 12*

STEERING A DRILL BIT WITH A ROTARY VALVE

CROSS-REFERENCE TO RELATED APPLICATIONS (S)

This application is a U.S. national stage patent application of International Patent Application No. PCT/US2017/042354, filed on Jul. 17, 2017, which claims priority to U.S. Provisional Application No. 62/410,268 filed Oct. 19, 2016, the disclosures of which are hereby incorporated herein by reference in their entirety.

TECHNICAL FIELD

The present disclosure generally relates to oilfield equipment and, in particular; to downhole tools, drilling and related systems for steering a drill bit. More particularly still, the present disclosure relates to methods and systems for steering a drill bit using a rotary valve.

BACKGROUND

Drilling wellbores in a subterranean formation usually requires controlling a trajectory of the drill bit as the wellbore is extended through the formation. The trajectory control can be used to steer the drill bit to drill vertical, inclined, horizontal, and lateral portions of a wellbore. In general the trajectory control can direct the drill bit into and/or through production zones to facilitate production of formation fluids, direct the drill bit to drill a portion of a wellbore that is parallel to another wellbore for treatment or production assist, direct the drill bit to intersect an existing wellbore, as well as many other wellbore configurations.

Therefore, it will be readily appreciated that improvements in the arts of steering a drill bit during drilling operations are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIG. 12 is a representative chart comparing material properties of an ScD material to material properties of alternative materials including PCD and WC materials;

DETAILED DESCRIPTION OF THE DISCLOSURE

Figure 1:
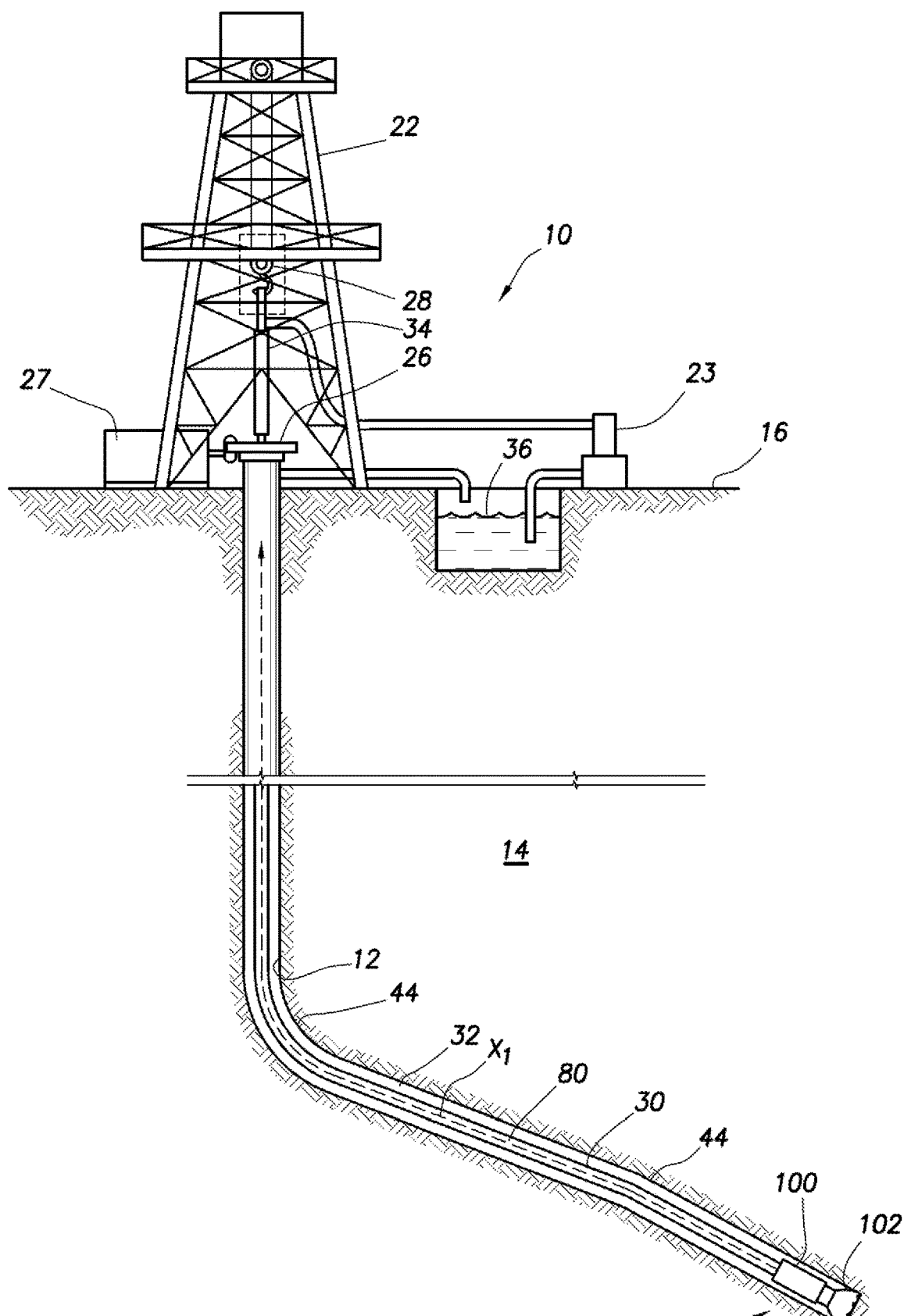
FIG. 1 is a representative partial cross-sectional view of an onshore well system including a downhole tool illustrated as part of a tubing string in accordance with an example embodiment of the disclosure.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an onshore operation, it should be understood by those skilled in the art that the method and/or system according to the present disclosure is equally well suited for use in offshore operations and vice-versa. Further, unless otherwise noted, even though a Figure may depict a cased hole, it should be understood by those skilled in the art that the method and/or system according to the present disclosure is equally well suited for use in open hole operations.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. It should also be understood that, as used herein, "first," "second," and "third," are assigned arbitrarily and are merely intended to differentiate between two or more objects, etc., as the case may be, and does not indicate any sequence. Furthermore, it is to be understood that the mere use of the word "first" does not require that there be any "second," and the mere use of the word "second" does not require that there be any "first" or "third," etc.

As used herein, the term "degradation" and all of its grammatical variants (e.g., "degrade," "degradable," "degrading," "dissolve," dissolving," "dissolvable," "corrode," "corrodible," "corrosion," "erode," "erosion," and the like) refers to the deterioration of an integrity of an object (or component) made from a solid material by reducing the mass of the solid object by at least one of a sliding friction between the solid object and other solid objects, an abrasive fluid flowing against parts of the solid object, a hydrolytic degradation, chemical reactions (including electrochemical and galvanic reactions), thermal reactions, or reactions induced by radiation that can degrade the solid object. In some instances, the degradation of the material may be sufficient for the mechanical properties of the material of the solid object to be reduced to a point that the material no longer maintains its integrity and, in essence, causes the solid object to no longer perform its intended purpose.

The terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

Generally, this disclosure provides a rotary valve that can include a housing and a manifold with multiple flow paths fixedly mounted to the valve housing. A rotary actuator with a first surface can be rotatably mounted within the valve housing, and a valve seat with a second surface can be fixedly attached to the manifold, where the second surface can sealingly engage the first surface. The rotary actuator can include a gap that selectively aligns with respective ones of valve seat ports as the rotary actuator rotates relative to the valve seat, thereby selectively pressurizing one or more actuators. A system and method are also provided which can include a rotary valve that selectively causes pads to extend at a predetermined orientation in the wellbore to steer a drill bit. The azimuthal orientation of a rotary actuator of the valve can determine which pads are extended and which are retracted as the drill bit rotates.

FIG. 1 shows a representative elevation view in partial cross-section of an onshore well system 10 which can include a drilling rig (or derrick) 22 at the surface 16 used to extend a tubing string 30 into and through portions of a subterranean earthen formation 14. The tubing string 30 can carry a drill bit 102 at its end which can be rotated to drill through the formation 14. A bottom hole assembly (BHA) 101 interconnected in the tubing string 30 proximate the drill bit 102 can include components and assemblies (not expressly illustrated in FIG. 1), such as, but not limited to, logging while drilling (FWD) equipment, measure while drilling (MWD) equipment, a bent sub or housing, a mud motor, a near bit reamer, stabilizers, and other downhole instruments. The BHA 101 can also include a downhole tool 100 that can provide steering to the drill bit 102, mud-pulse telemetry to support MWD/LWD activities, stabilizer actuation through fluid flow control, and near bit reamer control through fluid flow control. Steering of the drill bit 102 can be used to facilitate deviations 44 as shown in FIGS. 1 and 2, and/or steering can be used to maintain a section in a wellbore 12 without deviations, since steering control can also be needed to prevent deviations in the wellbore 12.

At the surface location 16, the drilling rig 22 can be provided to facilitate drilling the wellbore 12. The drilling rig 22 can include a turntable 26 that rotates the tubing string 30 and the drill bit 102 together about the longitudinal axis X1. The turntable 26 can be selectively driven by an engine 27, and selectively locked to prohibit rotation of the tubing string 30. A hoisting device 28 and swivel 34 can be used to manipulate the tubing string 30 into and out of the wellbore 12, To rotate the drill bit 102 with the tubing string 30, the turntable 26 can rotate the tubing string 30, and mud 36 can be circulated downhole by mud pump 23. The mud 36 may be a calcium chloride brine mud, for example, which can be pumped through the tubing string 30 and passed through the downhole tool 100. In some embodiments, the downhole tool 100 may be a rotary valve operable to impart pressure pulses in the mud 36, which can be detected at the surface 16 as will be appreciated by those skilled in the art. In other embodiments, the downhole tool 100 can include a rotary valve that selectively applies pressure to multiple output flow paths to control various pistons or other hydraulically actuated components. Additionally, the mud 36 can be pumped through a mud motor (not expressly illustrated in FIG. 1) in the BHA 101 to turn the drill bit 102 without having to rotate the tubing string 30 via the turntable 26.

The mud 36 can be expelled through openings (not shown) in the drill bit 102 to lubricate the drill bit 102, and returned to the surface 16 through an annulus 32 defined between the tubing string 30 and the earthen formation 14. Each of the components (including downhole tool 100) that is exposed to the mud 36 flow can be susceptible to degradation (e.g. corrosive and abrasive wear). According to embodiments of this disclosure, surfaces that are more prone to degradation due to interaction with the flow of the drilling mud 36 (or other potentially abrasive fluids) can be protected by a barrier material that can retard a degradation rate of the components, thereby extending the life of the downhole tool 100.

Figure 2:
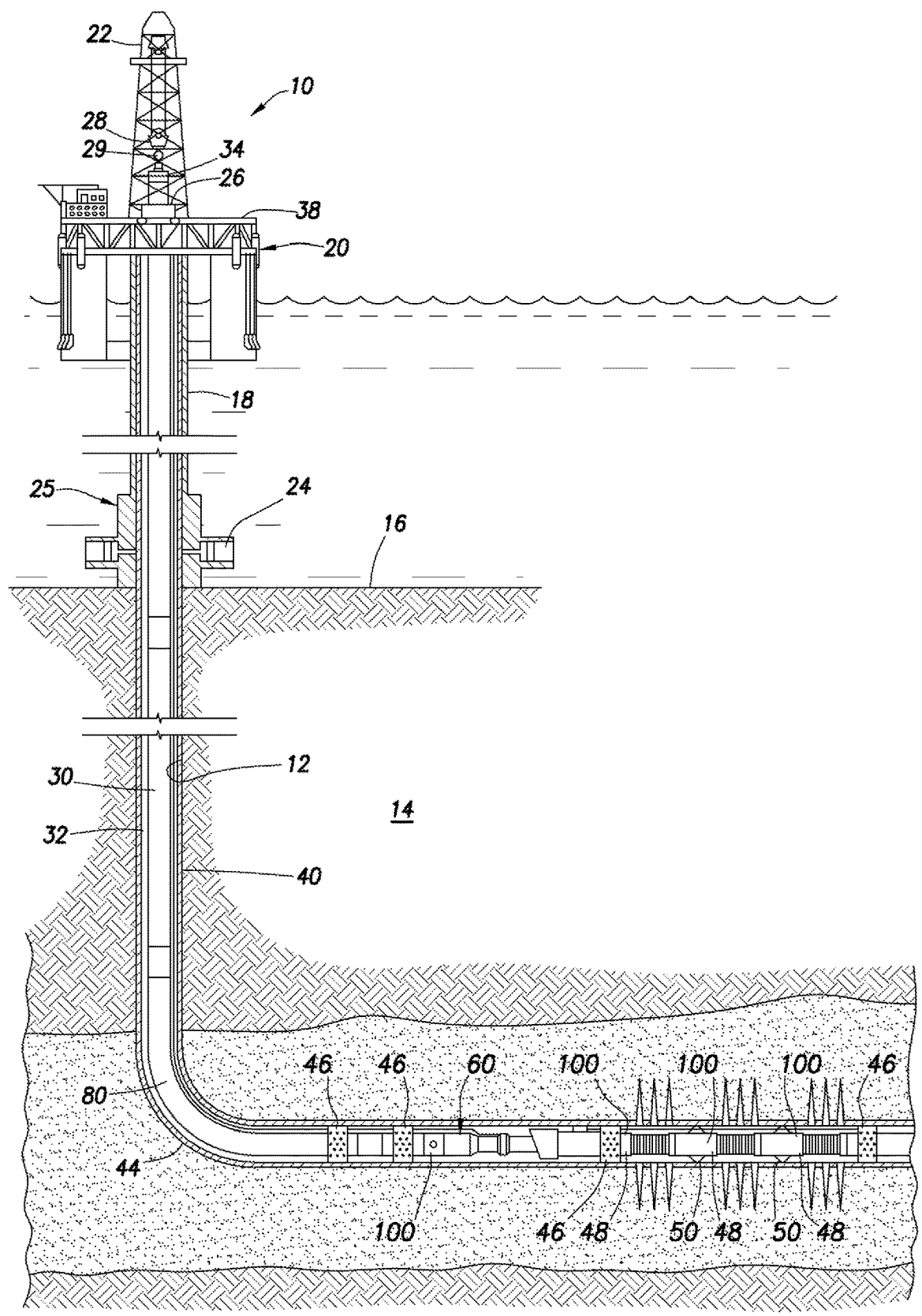
FIG. 2 is a representative partial cross-sectional view of a marine-based well system with one or more downhole tools in accordance with example embodiment(s) of the disclosure.

FIG. 2 shows a representative elevation view in partial cross-section of an offshore well system 10 which can include a rig (or derrick) 22 mounted to a semi-submersible platform 20 which can be floating in a body of water above a sea floor (or surface) 16. The offshore well system 10 is shown configured to produce formation fluid. It should be understood that the well system 10 can also be used initially to drill the wellbore 12, as well as perform completion operations such as wellbore 12 treatment operations, fracturing operations, and other production operations. For the production configuration, shown in FIG. 2, a completion assembly 60 can be installed in the wellbore 12. A subsea conduit 18 can extend from a deck 38 of the platform 20 to a subsea wellhead 25, including blowout preventers 24. The platform 20 can have a hoisting apparatus 28, a travel block 29, and a swivel 34 for raising and lowering pipe strings, such as a substantially tubular, axially extending tubing string 30, which can be referred to as a "production string" in this configuration.

A wellbore 12 can extend through the earthen formation 14 and can have a casing string 40 cemented therein. The completion assembly 60 may be positioned in a substantially horizontal portion of the wellbore 12. The completion assembly 60 can include one or more screen assemblies 48, and various other components, such as one or more packers 46, one or more centralizers 50, etc. Additionally, each screen assembly 48 can include one or more downhole tools 100, which can be flow control devices for managing fluid flow into or out of the tubing string 30 through the screen assemblies 48. AU of these components can be subject to degradation due to abrasive materials that can be carried by a fluid flowing through the annulus and/or the tubing string 30. The downhole tools 100 can be more susceptible to degradation caused by abrasive and/or caustic fluid, since the tools 100 can cause fluid flow restrictions and flow redirections. By creating any increased impingement of the fluid on surfaces of the device 100 can increase the degradation of the device 100. The degradation of the flow control devices 100 can be significantly reduced by protecting surfaces of the device 100 with a material that has an increased resistance to the degradation, such a diamond based materials.

Figure 3:
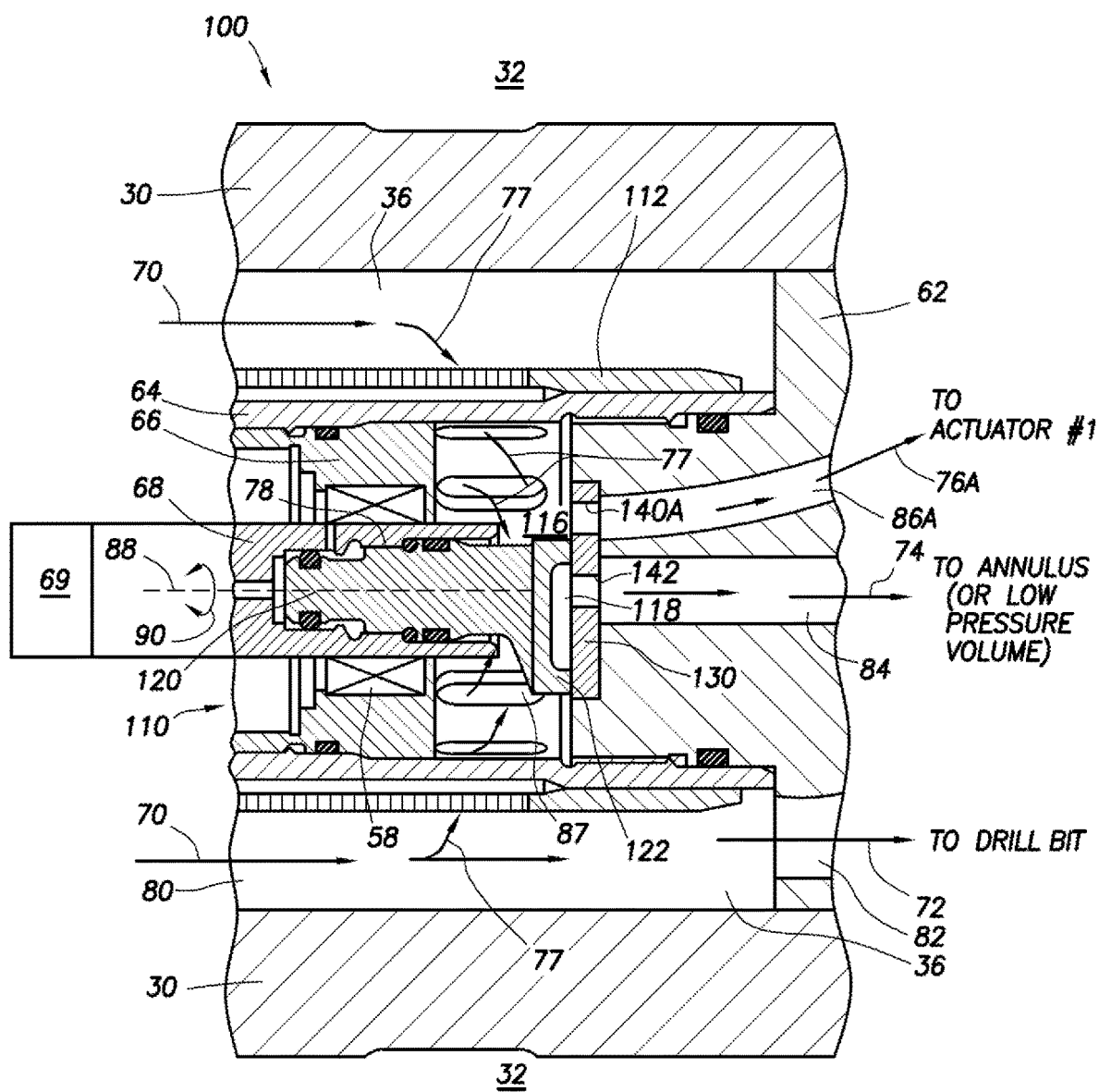
FIG. 3 is a representative cross-sectional view of an example embodiment of the downhole tool in FIG. 1 with a rotary valve.

Rotary Valve with Degradation Resistant Surfaces:

FIG. 3 shows an example of a downhole tool 100 that can be used to selectively actuate one or more hydraulic actuators. This particular embodiment illustrated in FIG. 3 is shown interconnected in a tubing string 30 via a housing 56, similar to the downhole tool 100 shown in FIG. 1. The downhole tool 100 can include a rotary valve 110 with a rotary actuator 120 that is engaged with a valve seat 130. An end 122 of the actuator 120 engages the valve seat 130 as the actuator 120 is rotated relative to the valve seat 130. The end 122 and the valve seat 130 can each be manufactured from a material that provides better resistance to degradation of these components than if the components were made from materials such as tungsten carbide, tempered steel, etc. By increasing the life of the rotary actuator 120 and valve seat 130, the life of the downhole tool 100 can also be extended.

The valve seat 130 can be fixedly attached or otherwise coupled to a flow manifold 62, which can have multiple flow paths for directing fluid flow received from the valve seat 130. The flow paths can direct fluid flow to various tool actuators, to the drill bit, to the annulus, to other chambers, and/or other locations in the downhole tool 100 or BHA 101. The manifold 62 can be fixedly attached or otherwise coupled to the tubing string 30 via the housing 56, such as by welding, brazing, threaded connections, etc. such that the manifold 62 rotates with the tubing string 30 when the tubing string 30 rotates. This allows ports that may be formed in the tubing string 30 to remain aligned with one or more of the flow paths of the manifold 62, such as a flow path through the manifold 62 to the annulus 32 through a wall of the tubing string 30.

The rotary valve 110 can have a cylindrical housing 64 that supports the rotary valve 110 components. Ports 87 allow fluid flow 77 through the housing 64 from an interior flow passage 80 of the tubing string 30 to the rotary actuator 120 and valve seat 130. The housing can be fixedly attached or otherwise coupled to the manifold 62, such that it rotates with the drill bit 102 and the valve seat 130. A motor 69 can be mounted within the housing 64 to rotate (arrows 90) a drive shaft 68 about a central axis 88 relative to the housing 64. Rotation of the drive shaft will rotate the rotary actuator 120 relative to the valve seat 130, thereby selectively enabling and disabling fluid flow through ports 140 in the valve seat 130. A beating seat 66 can be used to mount a rotary bearing 58 that rotationally mounts the drive shaft 68 to the housing 64 and helps keep the rotary actuator 120 centered within the housing. A filter 112 can be positioned about an outer surface of the housing 64 to filter drilling mud 36 that is received from the internal flow passage 80 into the rotary valve 110. This filter 112 can prevent objects carried by the mud 36 from clogging up the rotary valve 110, flow paths, and/or actuators controlled by the rotary valve 110. It should be understood that "motor," as used herein, refers to any suitable device (e.g. electric motor, mud motor, actuator, etc.) that can rotate the drive shaft 68 and thereby provide rotational control of the rotary actuator 120.

A portion 77 of the fluid flow 70 of the drilling mud 36 can enter the rotary valve 110 through the screen 112 and ports 87. The remaining portion 72 of the fluid flow 70 can travel through the bypass flow path 82 to continue on to the drill bit 102. As seen in FIG. 3, the rotary actuator 120 is in a rotated position that allows fluid flow 77 to enter the flow path 86A in the manifold 62 as fluid flow 76A. The fluid flow 76a can then be directed by the flow path 86A to an actuator #1, such as an actuator of other components of the downhole tool 100 and/or an actuator of another downhole tool. The developed pressure in the actuator #1 due to fluid and pressure communication through the rotary valve 110 in the configuration of FIG. 3 can be released when the rotary valve 110 rotates to a different position that prevents fluid and pressure communication through the rotary valve 110 to the flow path 86A. The developed pressure can be vented through the rotary valve 101 via the flow path 84 as fluid flow 74, which can be directed to a low pressure volume such as the annulus 32. This allows the actuator #1 to be deactivated.

Figure 4:
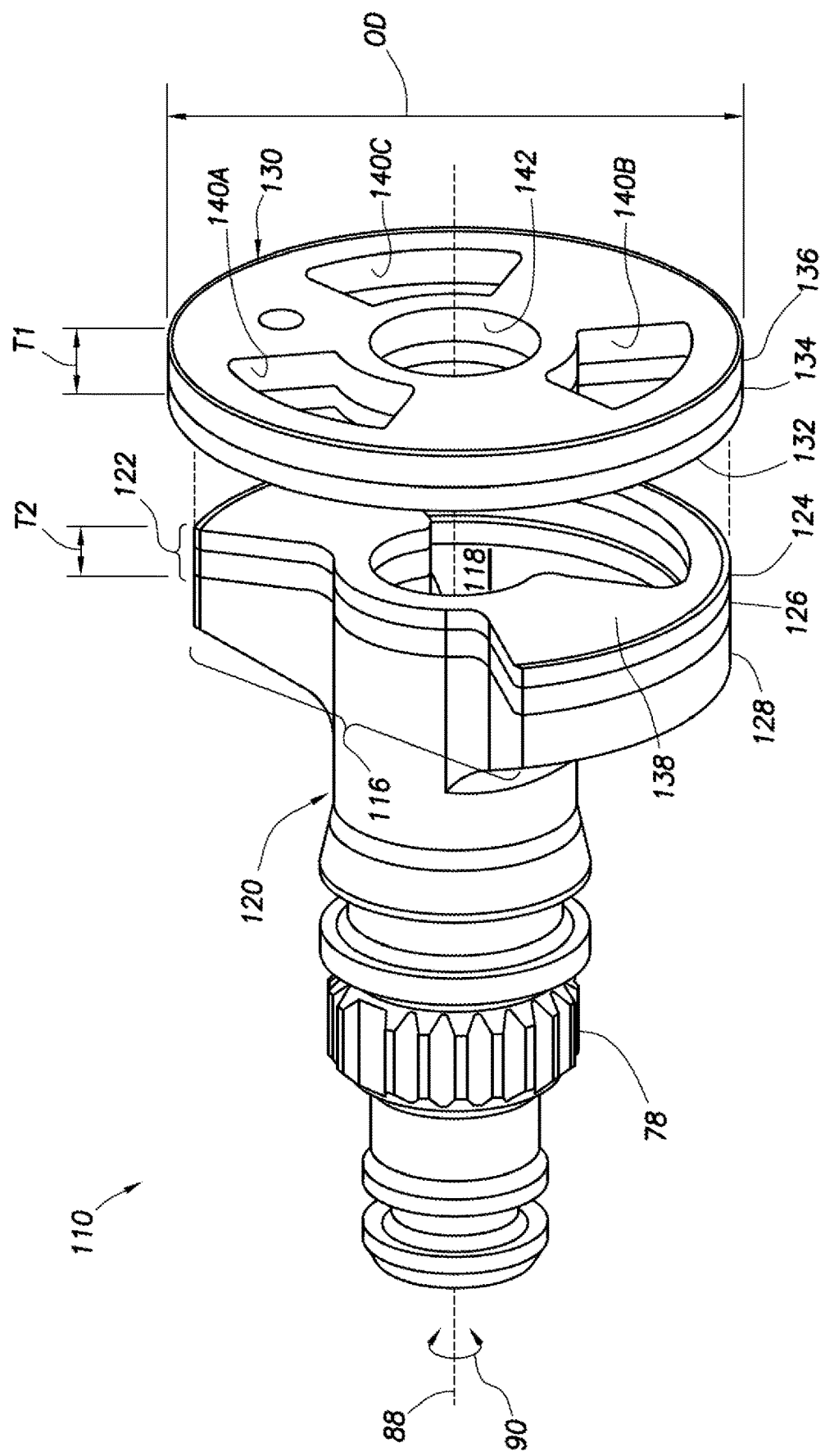
FIG. 4 is a representative perspective view of the rotary valve of FIG. 3 illustrating an exploded view of an example valve seat and rotary actuator.

FIG. 4 shows a perspective view of the rotary actuator 120 and the valve seat 130 of the rotary valve 110 without the other components of the rotary valve 110 for clarity. Also, the actuator 120 and valve seat 130 are shown separated by a space between surfaces 138 and 132. However, in operation the surfaces 138 and 132 sealingly engage each other and form a seal as a result of the engagement. It should be understood that the surfaces 138 and 132 are the surfaces that engage each other when the rotary actuator engages the valve seat. The surfaces 138 and 132 can surfaces on components that are rotationally fixed to the respective rotary actuator and valve seat, but are not required to be fixedly attached to other component(s) of the respective rotary actuator and valve seat.

As used herein, the rotary actuator comprises the first engagement surface 138, whether a component with the first engagement surface is attached to the rotary actuator or not. The component with the first engagement surface 138 can be rotationally fixed to the rotary actuator 120, but it is not required that component with the first engagement surface 138 be fixedly attached to the rotary actuator 120. As used herein, the valve seat 130 comprises the second engagement surface 132, whether a component with the second engagement surface 132 is attached to the valve seat 130 or not. The component with the second engagement surface 132 can be rotationally fixed to the valve seat 130, but it is not required that the component with the second engagement surface 132 be fixedly attached to the valve seat 130. As used herein, the "first and second" engagement surfaces 138, 132 are surfaces that form a seal between the rotary actuator and the valve seat.

The rotary actuator 120 can rotate in either direction 90 about the center axis 88. The splines 78 can be coupled to the drive shaft 68 and used to rotate the rotary actuator 120. The end 122 of the actuator 120 can be formed as a cylinder with a gap 116 formed in the circumference of the cylinder and a recess 118 formed in the surface 138 of the end 122. The recess 118 can extend through the end 122 and further into the main body of the actuator 120, if desired. A structure 128 of the main body of the actuator 120 can be used to support the end 122, which can be made up of layers 124, 126. Layer 124 can be made from a degradation resistant material (or materials) to reduce the degradation rate of the rotary actuator 120. The degradation to the actuator 120, and in particular to the end 122, can be caused by fluid flowing through the rotary valve 110 as well as engagement forces experienced by the surface 138 of the actuator 120 and the surface 132 of the valve seat 130. It should be understood that the end 122 can be made from a single layer of a degradation resistance material without there being two individual layers 124, 126. The two layers may be needed when a substrate 126 is used to support a degradation resistant material layer 124, such as Polycrystalline Diamond PCD.

The valve seat 130 of this rotary valve 110 can be made up of layers 134, 136. Layer 134 can be made from a degradation resistant material (or materials) to reduce the degradation rate of the valve seat 130. Similarly, the degradation to the valve seat 130 can be caused by fluid flowing through the rotary valve HO as well as engagement forces experienced by the surfaces 138 and 132. It should be understood that the valve seat 130 can be made from a single layer of a degradation resistance material without there being two individual layers 134, 136. The two layers may be needed when a substrate 136 is used to support a degradation resistant material layer 134, such as Polycrystalline Diamond PCI). The valve seat 130 can include ports 140A-C and 142 for fluid flow control with each of these ports associated with a different flow path in the manifold 62.

The operation of the valve 110 shown in FIG. 4 is illustrated by FIGS. 5A-5D. These figures show various rotational positions of the rotary actuator 120 relative to the valve seat 130. The following discussion discloses at least how this embodiment of the rotary valve 110 operates to selectively supply and receive fluid flow through the ports 140A-C and 142 of the valve seat 130. Ports 140A-C can be associated with actuators #1, #2, and #3, respectively, through flow paths in the manifold 62 (not shown in FIGS. 5A-5D).

Figure 5A:
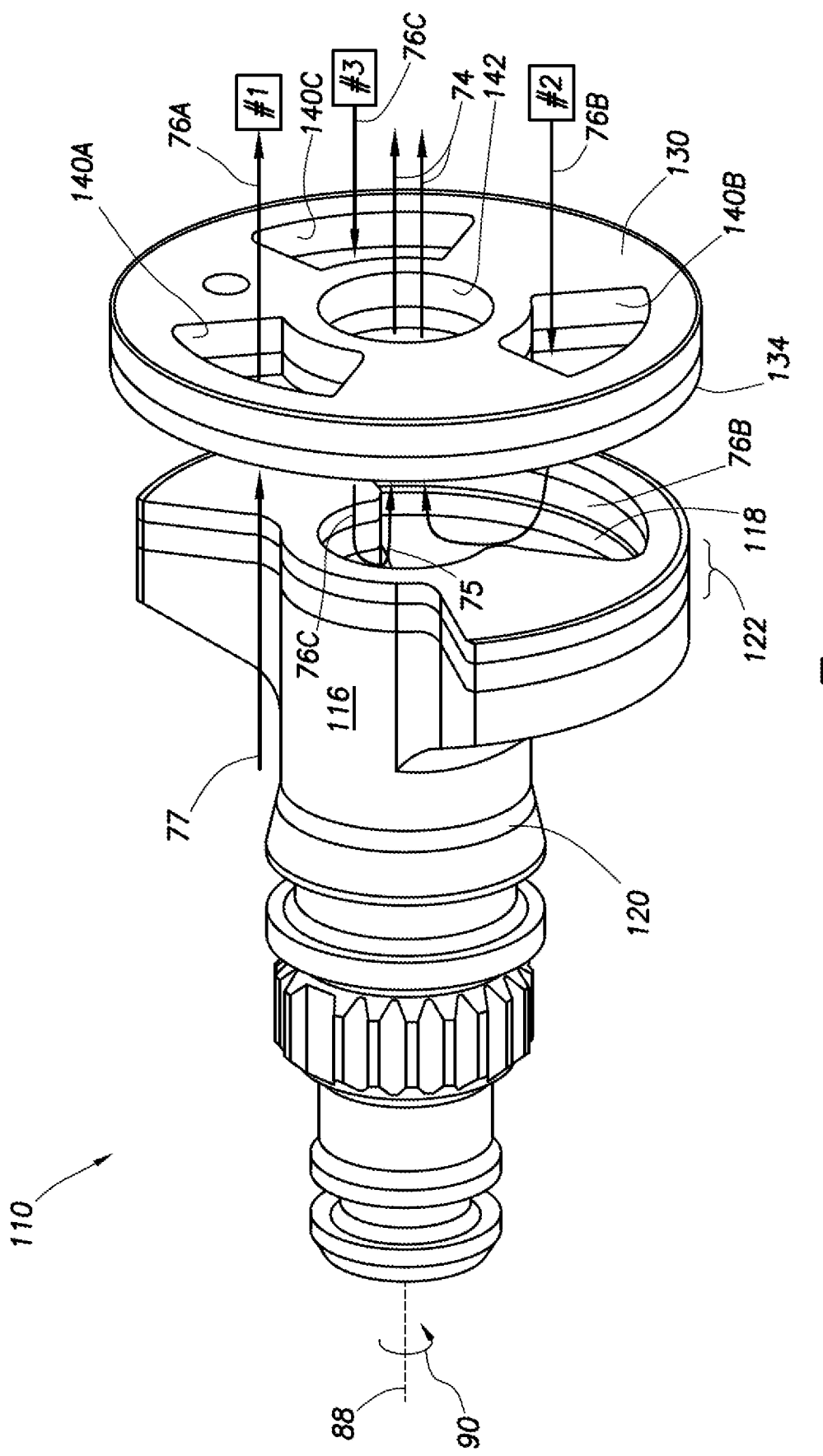
FIGS. 5A-5D are representative perspective views of the valve seat and rotary actuator of FIG. 4 with the rotary actuator rotated to various positions relative to the valve seat with resulting fluid flow through the rotary valve indicated by flow arrows for each rotational position.

FIG. 5A shows the rotary actuator 120 rotated such that the gap 116 is aligned with the port 140A, and at least a portion of the recess 118 is aligned with the ports 140B, 140C, and drain port 142. The drain port 142 remains aligned with a portion of the recess 118 that is centered on the central axis 88. Fluid flow 77 that has traveled through the screen 112 and ports 87 can pass through the port 140A as flow 76A, and be directed by the manifold 62 to an actuator #1. The flow 76A can pressurize the actuator #1 and thereby actuate the actuator #1. However, fluid flow 77 is prevented from flowing through ports 140B, 140C, since the rotary actuator 120 is blocking those ports from the fluid flow 77.

Through previous revolutions of the rotary actuator 120, actuators #2 and #3 could have been pressurized through ports 140B and 140C, respectively, via fluid flow 76B and 76C, respectively. Therefore, with ports 140B and 140C at least partially aligned with the recess 118, the pressure in the actuators #2 and 43 can be released by fluid flows 76B and 76C flowing back through the ports 140B, 140C into the recess 118. These fluid flows 76B, 76C can be diverted by the recess 118 (shown as U-turn arrows 75) into drain port 142 as fluid flow 74 and directed by the manifold 62 into the annulus 32 (or any other low pressure volume), thereby releasing the pressure in the actuators #2, #3. However, if no pressure was built up in the actuators #2 and #3, then fluid flows 76B, 76C would be minimal if any at all.

Figure 5B:
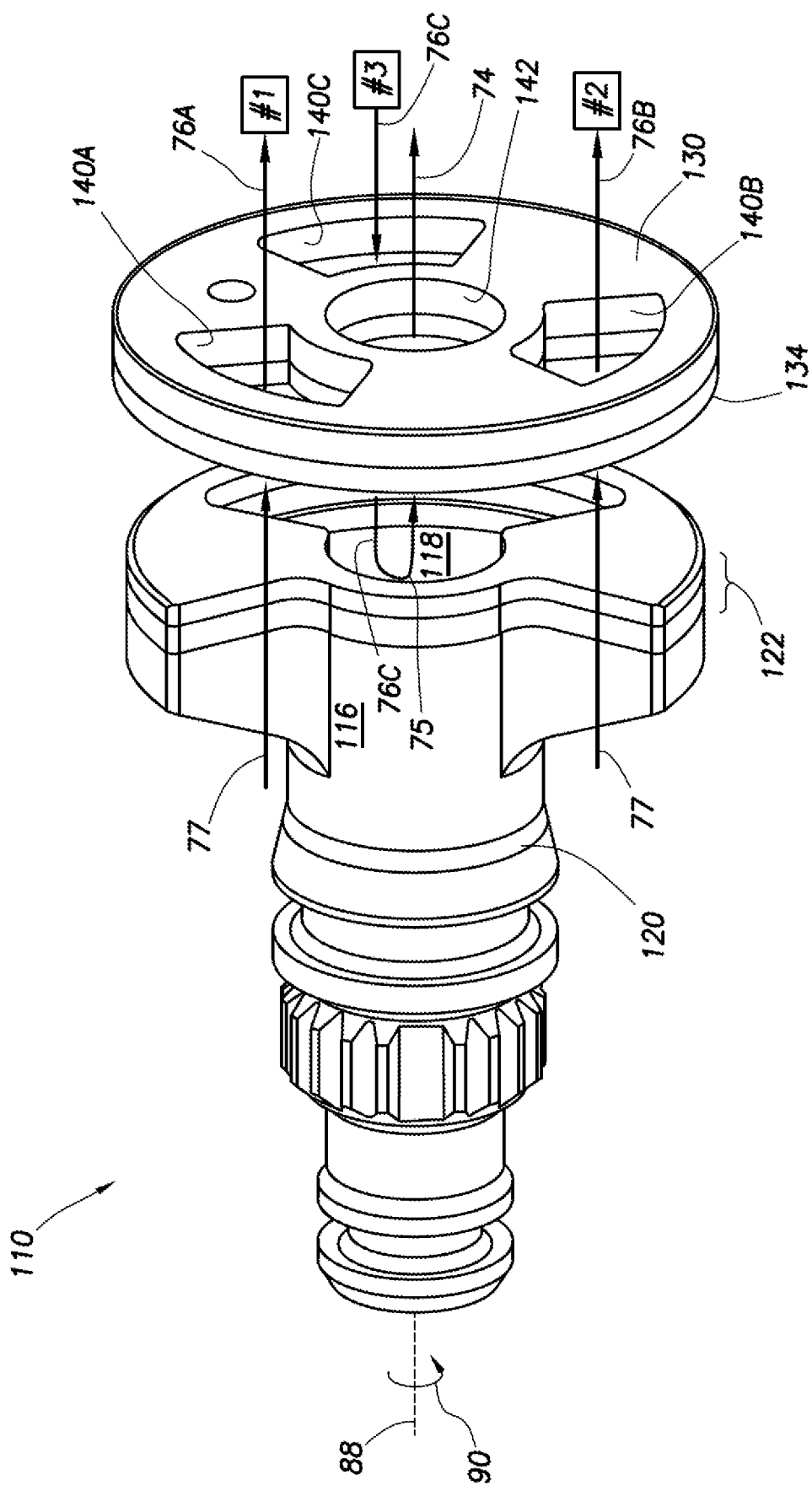

FIG. 5B shows the actuator 120 rotated further in the direction 90 such that port 140B is no longer aligned with the recess 118. However, port 140C remains aligned with recess 118, allowing pressure equalization of the actuator #3 with the low pressure volume (e.g. the annulus 32) by fluid flow 76C through port 140C, into recess 118 which redirects the fluid flow 76C (indicated by U-shaped arrow 75), and into drain port 142 as fluid flow 74, which can be directed to the annulus 32 by the manifold 62. Ports 140A, 140B are at least partially aligned with the gap 116, allowing fluid flow 77 to enter both ports, thereby pressurizing and activating the actuators #1 and #2.

Figure 5C:
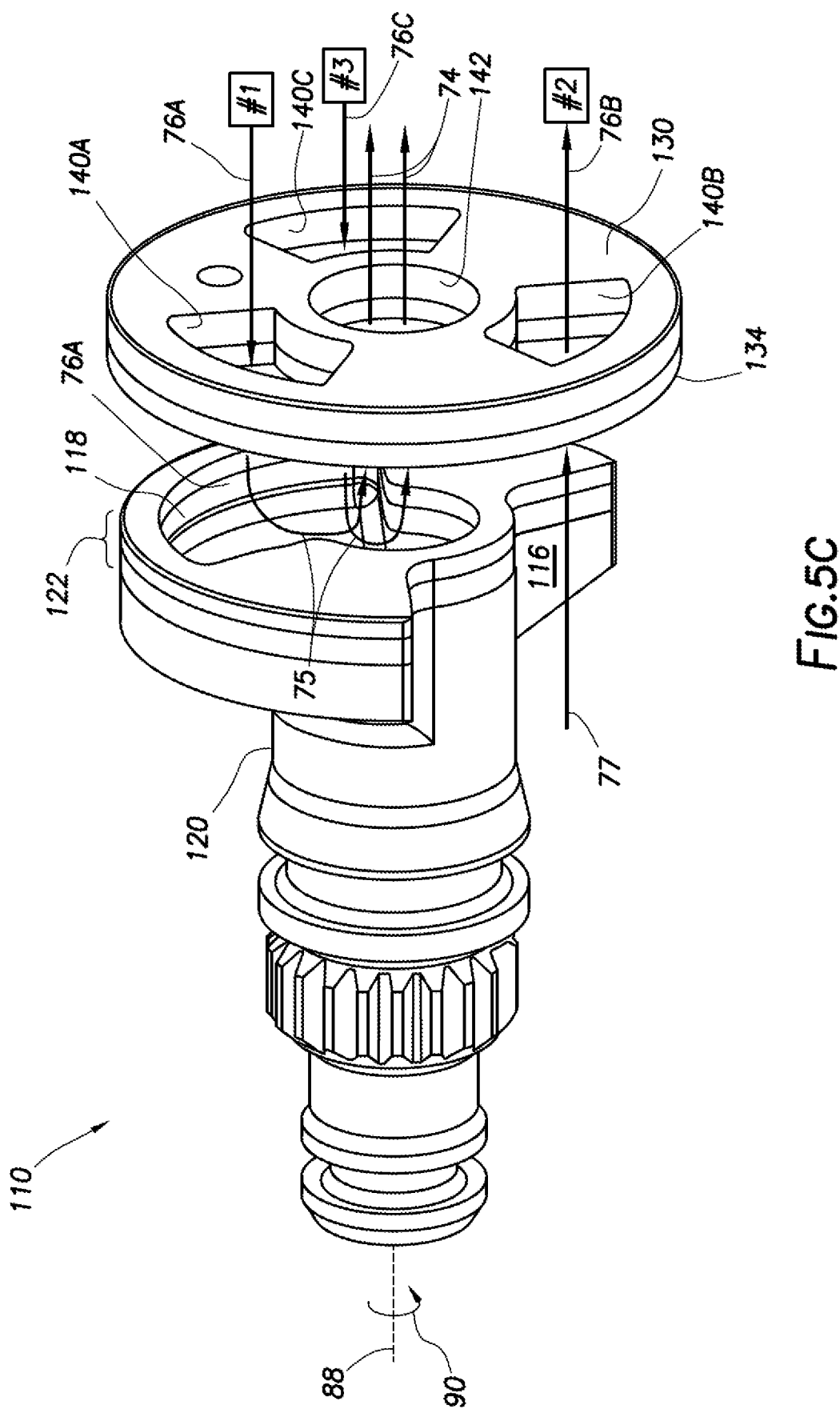

FIG. 5C shows the actuator 120 rotated further in the direction 90 such that ports 140A, 140C are at least partially aligned with the recess 118, allowing pressure in actuators #1 and #3 to be released by fluid flows 76A, 76C through ports 140A, 140C, respectively, into recess 118 which redirects the fluid flows 76A, 76C (indicated by U-shaped arrows 75) into drain port 142 as fluid flow 74, which is directed to the annulus 32 by the manifold 62. Port 140B is fully aligned with the gap 116, allowing fluid flow 77 to enter the port, thereby continuing to pressurize actuator #2.

Figure 5D:
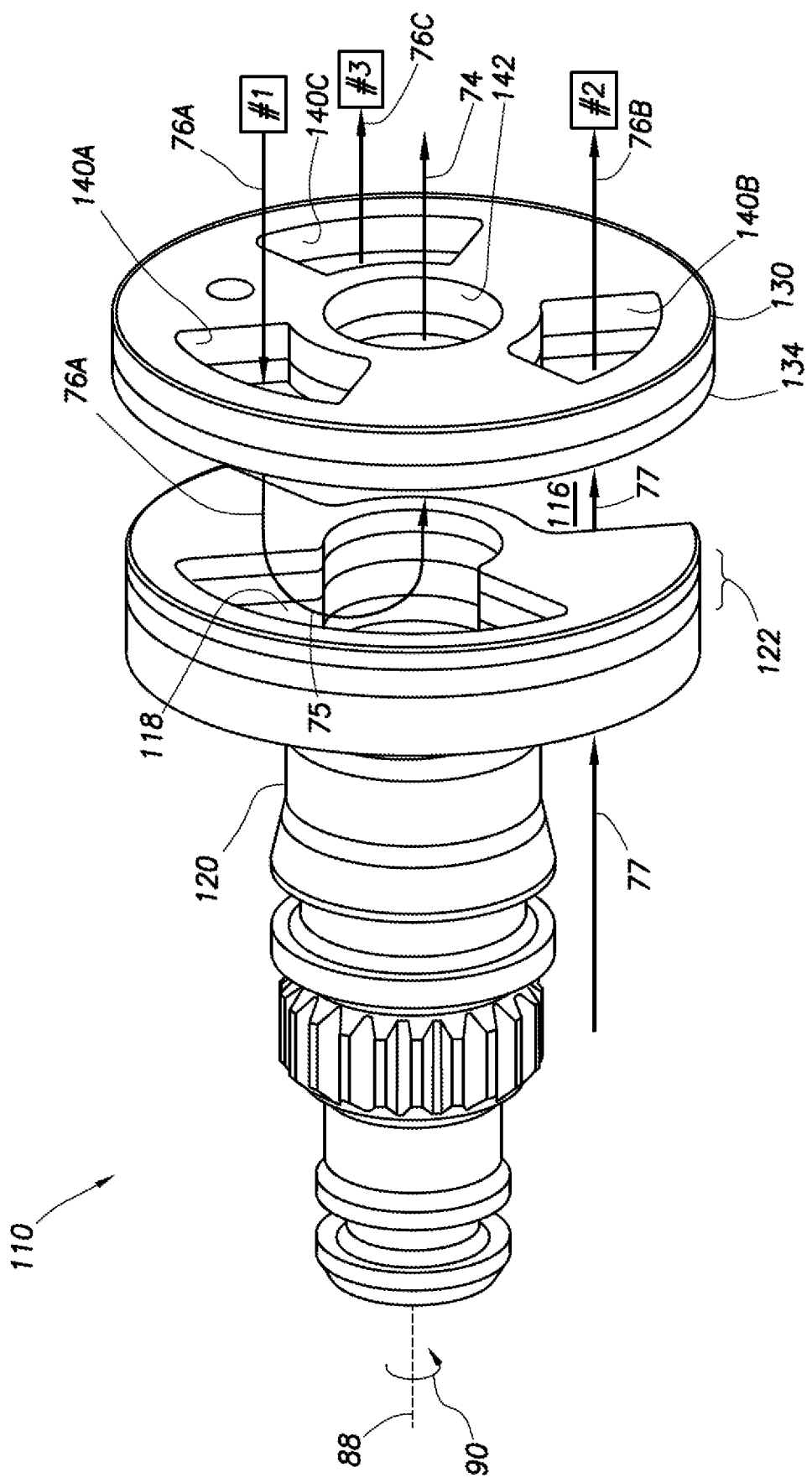

FIG. 5D shows the actuator 120 rotated further in the direction 90 such that port 140A is aligned with the recess 118, allowing pressure in actuator #1 to be further released by fluid flow 76A through port 140A into recess 118 which redirects the fluid flow 76A (indicated by U-shaped arrow 75) into drain port 142 as fluid flow 74, which is directed to the annulus 32 by the manifold 62. Ports 140B, 140C are at least partially aligned with the gap 116, allowing fluid flow 77 to enter both ports, thereby pressurizing the actuators #2 and #3. As the rotary actuator 120 continues to rotate these configurations (as well as other intermediate configurations) of the rotary valve 110 can be repeated until the actuator 120 is no longer rotated.

Figure 6:
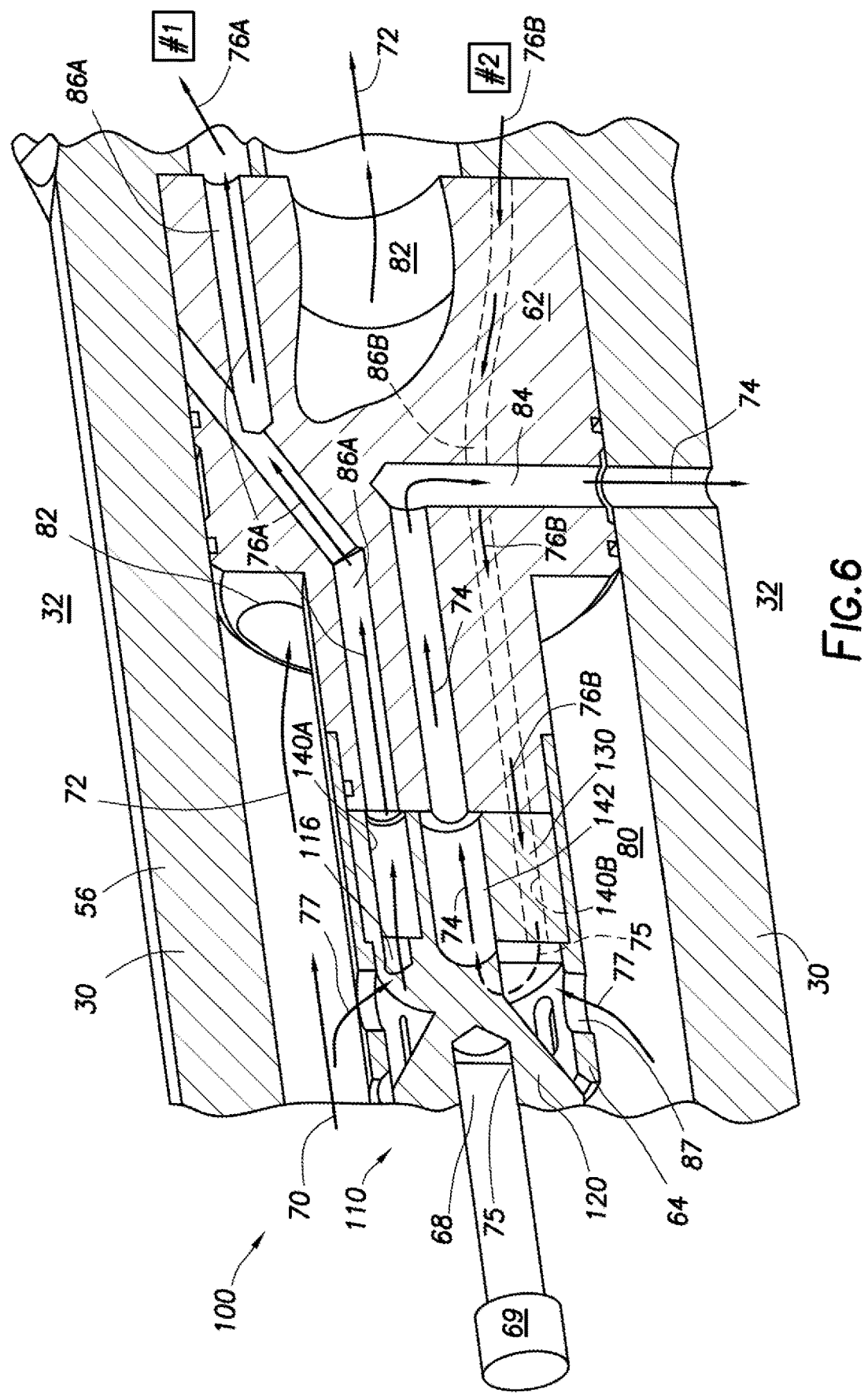
FIG. 6 is a representative perspective cross-sectional view of another example embodiment of the downhole tool in FIG. 1 with another rotary valve example.

FIG. 6 shows another embodiment of the rotary valve 110, with the manifold 62 fixedly attached or otherwise coupled to an inner surface of the tubing string 30 (or housing 56), and the valve seat 130 is fixedly attached or otherwise coupled to the manifold 62. The valve seat 130 is thicker in this embodiment, and has similar port configurations, such as ports 140A-C (ports 140B-C not shown) and drain port 142. The rotary actuator 120 engages the valve seat 130 and is rotated via a drive shaft 68 of a motor 69. The housing 64 can be attached to the manifold 62 to support the motor 69, drive shaft 68, and rotary actuator 120. Ports 87 in the housing 64 allow for a portion 77 of the drilling mud 36 (fluid flow 70) to enter the rotary valve 110. The rotary actuator 120 is rotated in FIG. 6 such that the gap 116

(shown as a port in this configuration) is aligned with port 140A of the valve seat 130 and flow path 86A of the manifold 62.

Fluid flow 77 flows through the gap 116, through the port 140A, and into flow path 86A as fluid flow 76A. The fluid flow 76A flows toward an actuator #1 and can pressurize and thereby activate the actuator #1. Since the flow path 86B is not in fluid communication with fluid flow 77, pressure in actuator #2 can be released through the recess 118 (shown as U-turn flow 75), through drain port 142 and out to the annulus 32 (or another low pressure volume) as fluid flow 74 through flow path 84. The rotary actuator 120 can be rotated as similarly described in reference to FIGS. 5A-5D to selectively activate and deactivate actuators coupled to the ports 140A-C, A majority of the drilling mud 36 (fluid flow 72) can flow through a bypass port 82 through the manifold 62 and on to the drill bit 102.

Figure 7:
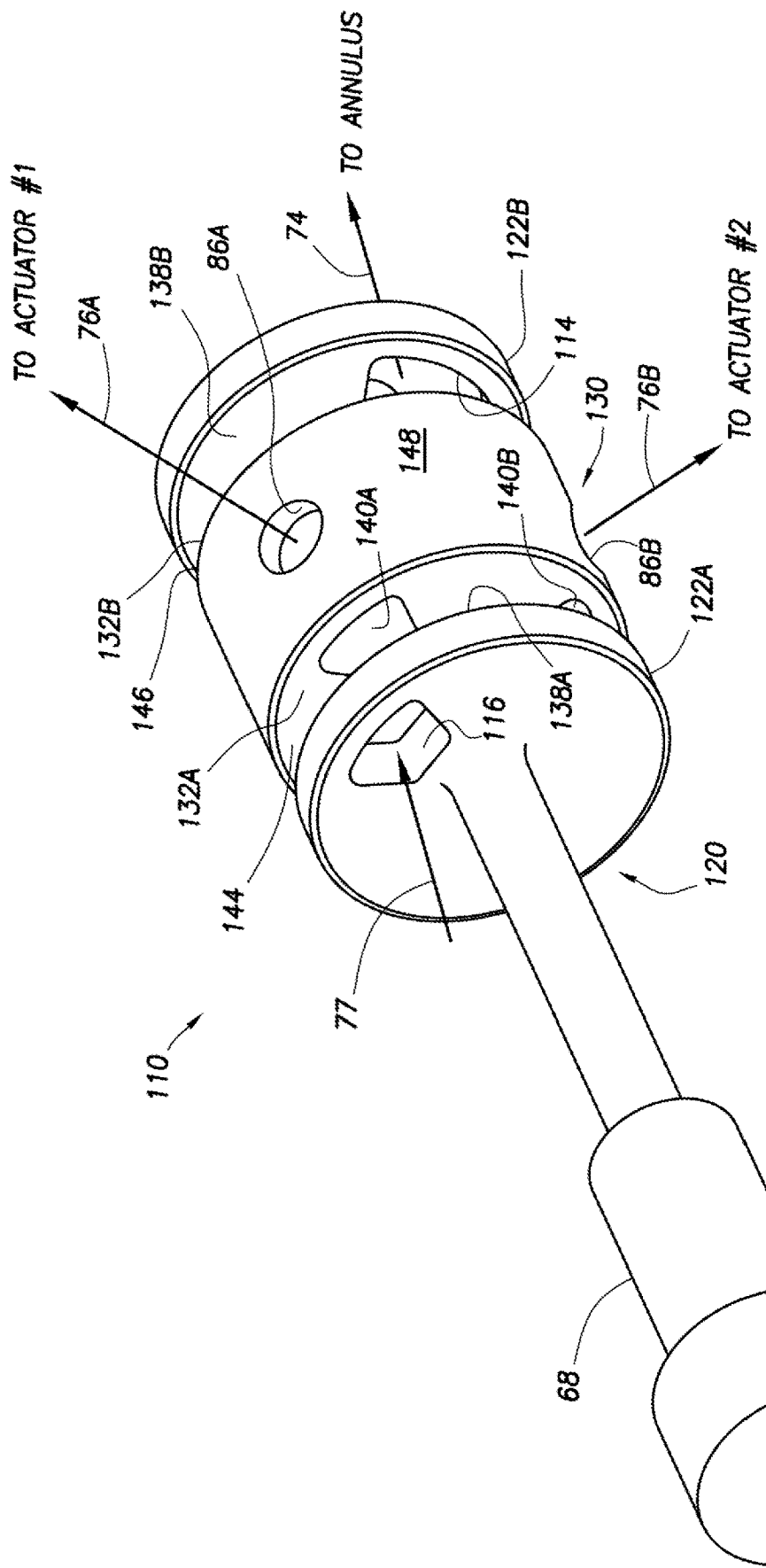
FIG. 7 is a representative perspective view of another example embodiment of a rotary valve which can be used in either of the downhole tools of FIGS. 1 and 2.

FIG. 7 shows yet another embodiment of the rotary valve 110, which is similar in operation to the previous embodiments, in that it can be used to selectively activate and deactivate additional actuators #1, #2, and #3 (or more if desired). The rotary valve 110 includes a rotary actuator 120 and a valve seat 130. The valve seat 130 is coupled to the tubing string 30 (or housing 56) such that the seat 130 rotates with the drill bit 102. The valve seat 130 is cylindrically shaped with top and bottom surfaces 144, 146, and a sidewall surface 148. Ports 140A-C are formed as extended flow paths through the valve seat 130 from the top surface 144 to the bottom surface 146, with intersecting flow paths 86A-C, respectively, extending from the respective ports 140A-C to the sidewall surface 148. Therefore, fluid entering the port 140A, for example, can exit from the sidewall surface 148 via the flow path 86A, and/or from the bottom surface 146 from the end of the port 140A. It should be understood, that even though FIG. 7 indicates three ports 140A-C, more or fewer of these ports can be used in keeping with the principles of this disclosure.

The rotary actuator 120 can have two ends 122A, 122B with each end being shaped as a disk. The end 122A can be positioned proximate the top surface 144 of the valve seat 130, with the end 122B positioned proximate the bottom surface 146 of the valve seat 130, and with a center shaft connecting the ends 122A, 122B together through a center opening in the valve seat 130. The center shaft (or structure 128) can be an extension of the drive shaft 68, with the ends 122A, 122B rotating with the drive shaft 68. The top end 122A can have a gap 116 (which is shown as a port 116 in FIG. 7) extending through the end 122A that selectively allows fluid flow 77 into various ones of the ports 140A-C and flow paths 86A-C. The fluid flow 77 can be received from fluid flow 70 of the drilling mud 36 flowing through the interior flow passage 80 of the tubing string 30. A low pressure port 114 can be formed in the end 122B to allow fluid from selected ones of the ports 140A-C to dump fluid flow 74 to the annulus 32 (or another low pressure volume) through flow path 84 (not shown). In this configuration, the low pressure port 114 is formed as a "C-shaped" void in the end 122B and partially surrounds a center connection of the end 122B to the drive shaft 68, leaving a portion of the surface 138B available to selectively block flow between the actuators #1, #2, and #3 and a low pressure volume. This low pressure port 114 can be enlarged or reduced to facilitate control over when the actuators #1, #2, and #3 are depressurized as the rotary actuator 120 rotates, by adjusting the duration of the alignment of the ports 140A-C with the low pressure port 114. Enlarging the size of low pressure port 114 can reduce an amount of time one or more of the actuators are pressurized. Reducing the size of low pressure port 114 can increase an amount of time one or more of the actuators are pressurized.

The gap 116 in the end 122A can be aligned with the remaining portion of the surface 138B, and not aligned to the "C-shaped" void (i.e. low pressure port 114) in the end 122B. Therefore, when the rotary actuator 120 is rotated such that the gap 116 is aligned with one of the ports 140A-C, such as 140A as seen in FIG. 7, then fluid flow 77 can flow through the gap 116, into the selected port (e.g. port 140A) and out the sidewall surface 148 through a respective flow path (e.g. path 86A). With port 140A selected, pressure can be applied to an actuator #1 that can be in fluid communication with the path 86A. Therefore, the actuator #1 can actuate a downhole tool when the gap 116 aligns with the port 140A. In this configuration, the gap 116 is not aligned with the other ports 140B, 140C.

These ports 140B, 140C are aligned to the low pressure port 114 in the end 122B which allows pressure to be released from the actuators #2, #3 through flow paths 86B, 86C, respectively, and ports 140B, 140C, respectively. As the rotary actuator 120 is rotated relative to the valve seat 130, the gap 116 will misalign from one port (e.g. 140A) and align to another port (e.g. 140B or 140C), The port 140A can align with the low pressure port 114 thereby releasing pressure from an actuator #1 through the flow path 86A, the port 140A, and the low pressure port 114 to the annulus 32 (or low pressure volume). With the gap 116 aligned to port 140B, for example, then pressure can be applied to an actuator #2 by fluid flow 77 being received through the gap 116, the port 140B, and the flow path 86B. As the rotary actuator 120 continues to rotate, the ports 140A-C can be sequentially selected and deselected to sequentially activate and deactivate the actuators 41, #2, 43 coupled to their respective ports 140A-C.

Figure 8:
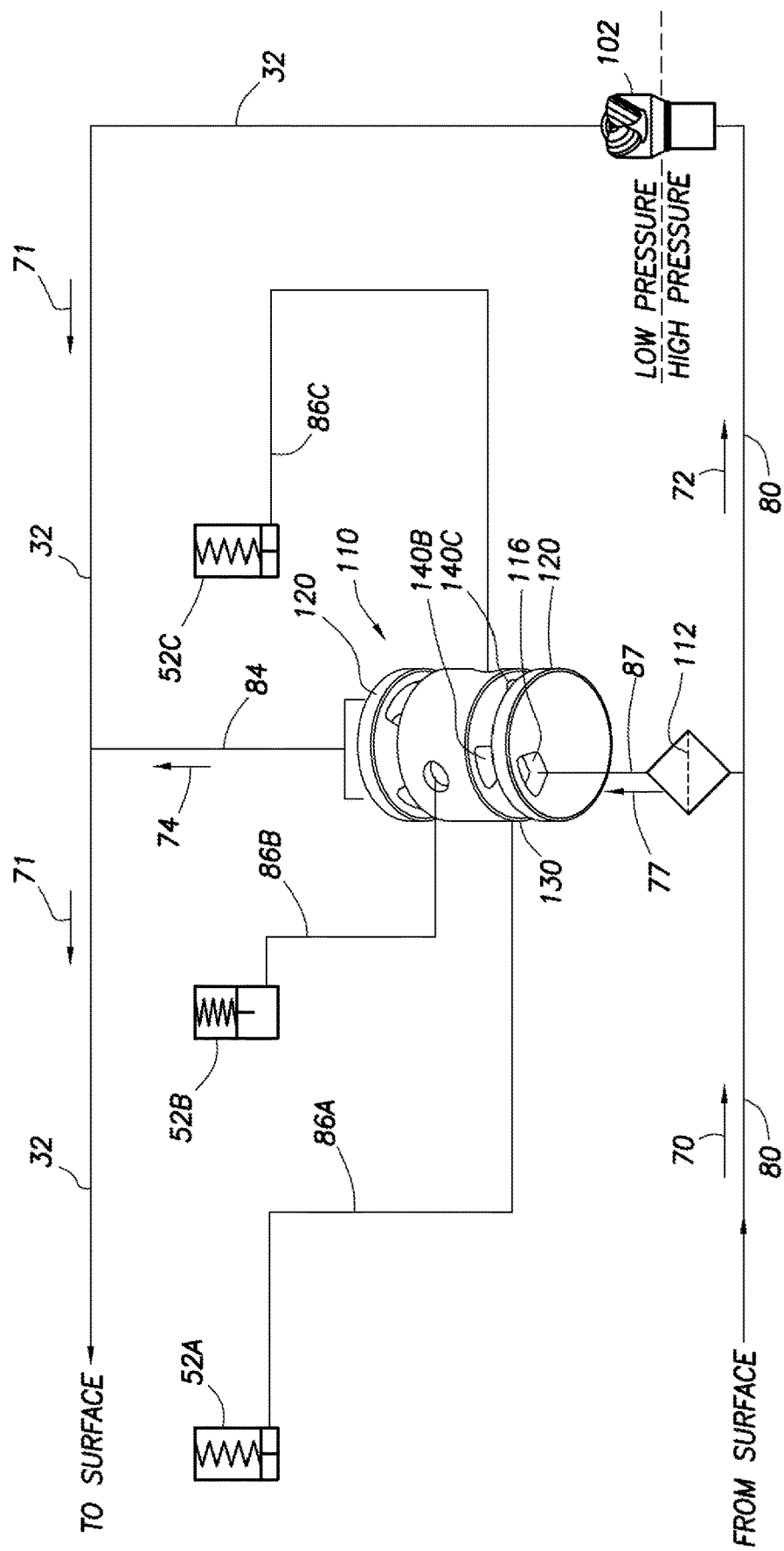
FIG. 8 is a schematic representation of a hydraulic circuit that utilizes the rotary valve of FIG. 7 to selectively actuate a plurality of pistons in a downhole tool.

FIG. 8 shows a schematic diagram of an example rotary valve 110 being used to selectively activate and deactivate actuators #1, #2, #3 which are shown as pistons 52A-C. FIG. 8 shows a three-way rotary valve 110 similar to the rotary valve 110 in FIG. 7. However, it should be understood that any of the rotary valves 110 given in this disclosure can be substituted for the rotary valve 110 shown in FIG. 8, and more or fewer pistons can be supported by this configuration. In FIG. 8, the rotary valve 110 can be used to synchronize pad extensions of a downhole tool 100 with rotation of the drill bit 102 and facilitate steering of the drill bit 102.

Drilling mud 36 (i.e. fluid flow 70) can be pumped from the surface 16 through the tubing string 30 via the interior flow passage 80. This mud can be referred to as a "high" pressure side of the system. Some of the mud 70 can be diverted as flow 77 to supply fluid and pressure to the rotary valve 110, with the remainder (and majority) of the mud 36 flowing to the drill bit 102 as fluid flow 72, under "high" pressure. The diverted flow 77 can pass through a screen 112 to filter any debris or other objects from the fluid before it enters the rotary valve 110.

As the mud 36 flows through the drill bit 102 and into the annulus 32, the mud 36 can experience a pressure drop across the drill bit 102. Therefore, the annulus can be referred to as a "low" pressure side of the system. The rotary valve 110 can be connected between the "high" pressure and "low" pressure sides as shown in FIG. 8. Fluid flow 77 can enter the rotary valve 110 from the "high" pressure side via the ports 87 and the gap (or port) 116, and exit the rotary valve 110 to the "low" pressure side via the port 114 which is in fluid communication with the annulus 32 (a low pressure volume). The rotary valve 110 can be used to control the three pistons 52A-C. These pistons 52A-C can be connected to ports 140A-C via flow paths 86A-C, respectively. Again, it should be understood that more or fewer of these pistons can be controlled by the rotary valve 110. As the rotary actuator 120 is rotated, the pistons 52A-C are selectively activated and deactivated.

When the gap 116 is aligned with port 140A, then pressure can be applied to flow path 86A and thereby activate piston 52A. When the gap 116 is aligned with port 140B, then pressure can be applied to flow path 86B and thereby activate piston 52B, with the pressure in piston 52A being released through port 114 into flow path 84 as fluid flow 74, which is dumped into the annulus 32 where it joins the mud flow 71 flowing back to the surface 16. When the gap 116 is aligned with port 140C, then pressure can be applied to flow path 86C and thereby, activate piston 52C, with the pressure in pistons 52A, 52B being released through port 114 into flow path 84 as fluid flow 74, which is dumped into the annulus 32 where it joins the mud flow 71 flowing back to the surface 16. This sequence can continue as long as the rotary actuator 120 continues to rotate relative to the valve seat 130. As can be seen in FIG. 8, the gap 116 is aligned with the port 140B which allows pressure to be applied to the piston 52B through the flow path 86B. The piston 52B is shown extended in the chamber of the piston 52B.

In one example, the rotary valve 110 can be used to steer the drill bit 102 as the drill bit spins to extend the wellbore 12. The pistons 52A-C can be used to extend and retract guidance pads that are circumferentially spaced apart on an exterior of the tubing string 30 (or housing 56). In some configurations, the pistons 52A-C can be used to contact the wellbore 12 directly without using the guidance pads. As these guidance pads (or pistons 52A-C) are selectively extended into contact with the wellbore 12, the tubing string 30 can be pushed away from a wellbore wall contacted by the extended pad (or piston) and pushed toward an opposite wellbore wall if selected guidance pads are periodically extended, then the drill bit 102 can be guided in an azimuthal direction away from the longitudinal axis X1 to change the trajectory of the drill bit through the earthen formation 14 as the wellbore 12 is extended. To periodically extend the guidance pads at a desired azimuthal orientation relative to the wellbore 12, the guidance pad extensions can be synchronized with the rotation of the tubing string 30 by using the rotary valve 110 to control the extensions and retractions of the extendable pads (or pistons 52A-C).

With the tubing string 30 rotating at a given RPM, then the motor 69 included in the rotary valve 110 can be controlled to rotate the drive shaft 68 (and therefore the rotary actuator 120) at the given RPM but in an opposite direction. Therefore, the rotary actuator 120 can be seen as "geostationary" compared to the earthen formation 14 and the wellbore 12. As the drill bit 102 rotates, the rotary actuator 120 rotates relative to the valve seat 130 (which rotates with the drill bit 102 and housing 56). Once the actuator 120 is set to a desired azimuthal orientation relative to the wellbore 12 by the motor 69, then the motor 69 can be used to maintain that orientation relative to the wellbore 12 as the drill bit 102 rotates. As the valve seat 130 rotates with the drill bit 102, it will present the ports 140A-C in sequence to the gap 116 of the rotary actuator 120, thereby pressurizing the associated piston 52A-C when individual ports 140A-C align with the gap 116. As each individual port 140A-C misaligns from gap 116, it will align with exit port 114, thereby releasing pressure in the respective piston 52A-C. With the actuator 120 "geostationary," it can be seen that each pad (or piston) extended due to alignment of the gap 116 with individual ports 140A-C, will be extended in a desired azimuthal orientation, which is determined by the azimuthal orientation of the actuator 120 relative to the wellbore 12, where the desired azimuthal orientation of the actuator 120 can be different from the desired azimuthal orientation for extending the individual pads. In this manner, periodic pad extensions at the same desired azimuthal orientation can continue to steer the drill bit 102 in a desired azimuthal orientation (which can also be different that the other azimuthal orientations) away from the central longitudinal axis X1 of the wellbore 12. It should understood, that the discussion regarding FIG. 8 relates to the rotary valve 110 shown in FIG. 7, but any other embodiment of the rotary valve 110 in this disclosure can also be used to control selective activation and deactivation of the pistons 52A-C.

Silicon Carbide Diamond (ScD) Degradation Resistant Material:

Degradation, such as corrosion, erosion, chemical degradation, etc. can occur downhole due to interaction with drilling fluids, wellbore fluids, treatment fluids, friction between moving parts and/or fluid flow, etc. The downhole environment can be so caustic and harsh that downhole tools might deteriorate to a point they no longer function properly. This can occur prior to the downhole tool 100 or valve 110 completing a necessary wellbore operation. Such a failure can cause the operation to fail, thereby requiring whole or at least a portion of the operation to be repeated. For example, the rotary valve 110 shown in FIGS. 3 and 4 can have drilling mud 36 (FIG. 1) passing through the ports 140A-C, the drain port 142, and the gap 116 causing degradation of these components. Also, the surfaces 132, 138 maintain engagement as they are displaced relative to each other thereby causing friction that tends to erode or otherwise degrade the surfaces. Therefore, components of the downhole tool 100 or the valve 110 that are more susceptible to degradation can be made from degradation resistant materials, such as diamond, to limit degradation and thereby extend the life of the tool and/or valve. If the valve 110 failed, then the operation of actuators coupled to the rotary valve 110 could be affected, thereby preventing tools supporting the drilling operation to not function properly, such as drill bit steering.

Diamond, even synthetic diamond, has an increased hardness and reduced friction when compared to other materials, such as metals. Both of these characteristics of diamond, as well as others, help reduce and resist degradation effects of abrasive fluids and friction on various downhole tool components. Therefore, the more diamond that can be used to fabricate portions (or complete assemblies) of the downhole tools 100, the more resistance to degradation of the downhole tool 100 components can be achieved resulting in longer life for the tools and reduced failure rates during downhole operations.

One such diamond material widely used to provide degradation resistance is polycrystalline diamond (PCD). However, PCD is not conducive to producing large area components at an acceptable thickness, Typically, PCD components are formed in a High Temperature-High Pressure (HT-HP) cubic press, as a powder layer of diamond material pressed against a substrate that includes a binder material (or catalyst). Under the appropriate conditions in the HT-HP press, a catalyst (such as cobalt) in the substrate (such as tungsten carbide (WC)) causes the diamond particles of the powder to bind together to form a diamond table on the substrate. Cubic presses used in the construction of PCI) components (for typical cutter applications) are generally limited to about 30 mm in diameter, and since the thickness of the diamond table achievable on a PCD component generally decreases with the diameter of the cubic press, desired thicknesses (e.g. on the order of 2.5 mm) may not be achievable. Belt presses may be able to generate a diamond table having a larger diameter than the cubic presses, but again, the thickness of a diamond table achievable with a belt press decreases with the diameter, as will be appreciated by those skilled in the art. Again, the desired thicknesses at the desired diameters may not be achievable with PCD whether the PCI) is produced using either the cubic or belt presses.

If the cubic or belt presses were used to produce a PCD layer on a portion of a downhole tool 100 (e.g. portions of the rotary valve 110 shown in FIGS. 3 and 4), the process could include forming a PCD layer on a couple of WC substrates, each with an outer diameter OD shown. The first PCD-WC substrate with thickness T2 can be used to fabricate the end 122 of the rotary actuator 120, where the Tungsten Carbide WC layer of the substrate is indicated as layer 126, and the PCD layer is indicated as layer 124. It should be understood that the relative thicknesses of the layers 126 and 124 are exaggerated for discussion purposes, but that the PCD layer 124 can be much thinner relative to the WC layer 126 than what is shown in FIG. 4. Once the first PCD-WC substrate is formed in one of the presses, then it can be mounted to the structure 128 to form the rotary actuator 120.

Mounting the first PCD-WC substrate to the structure 128 is generally performed through brazing, where a braze material is applied between the first PCD-WC substrate and the structure 128, and then subjected to a high temperature to melt the braze material thereby bonding the structure 128 and the first PCD-WC substrate together. With the PCD material, the brazing temperature is restricted to stay below about 700 degree C. Unfortunately, this temperature range is not ideal for brazing, and can produce weak bonding between the structure 128 and the first PCD-WC substrate. If the brazing temperature were increased above 700 degrees C., then the PCD material can breakdown or graphitize, thus damaging its diamond-like characteristics. A second PCD-WC substrate can be used to form the valve seat 130, with layer 136 being the WC and layer 134 being the PCD. Again, the thicknesses of layers 134, 136 are exaggerated for discussion purposes. The PCD layer 134 is likely much thinner relative to the WC layer 136 than what is shown in FIG. 4.

Once the a PCD-WC substrate is bonded to the structure 128 (or the manifold 62), then an Electrical Discharge Machining (EDM) can be used to shape the layers 124, 126, and structure 128 as seen in FIG. 4, including forming the recess 118 and the gap 116. As described later, the cobalt used to bind the diamond particles to form PCD is highly susceptible to degradation in acidic environments, which can cause the PCD to be more sensitive to degradation in acidic environments. The cobalt can be removed by chemical processes that leach the cobalt from the PCD. However, this causes the PCD to become non-electrically conductive, which can prevent the Electrical Discharge Machining (EDM) from being able to mill the PCD.

Figure 9:
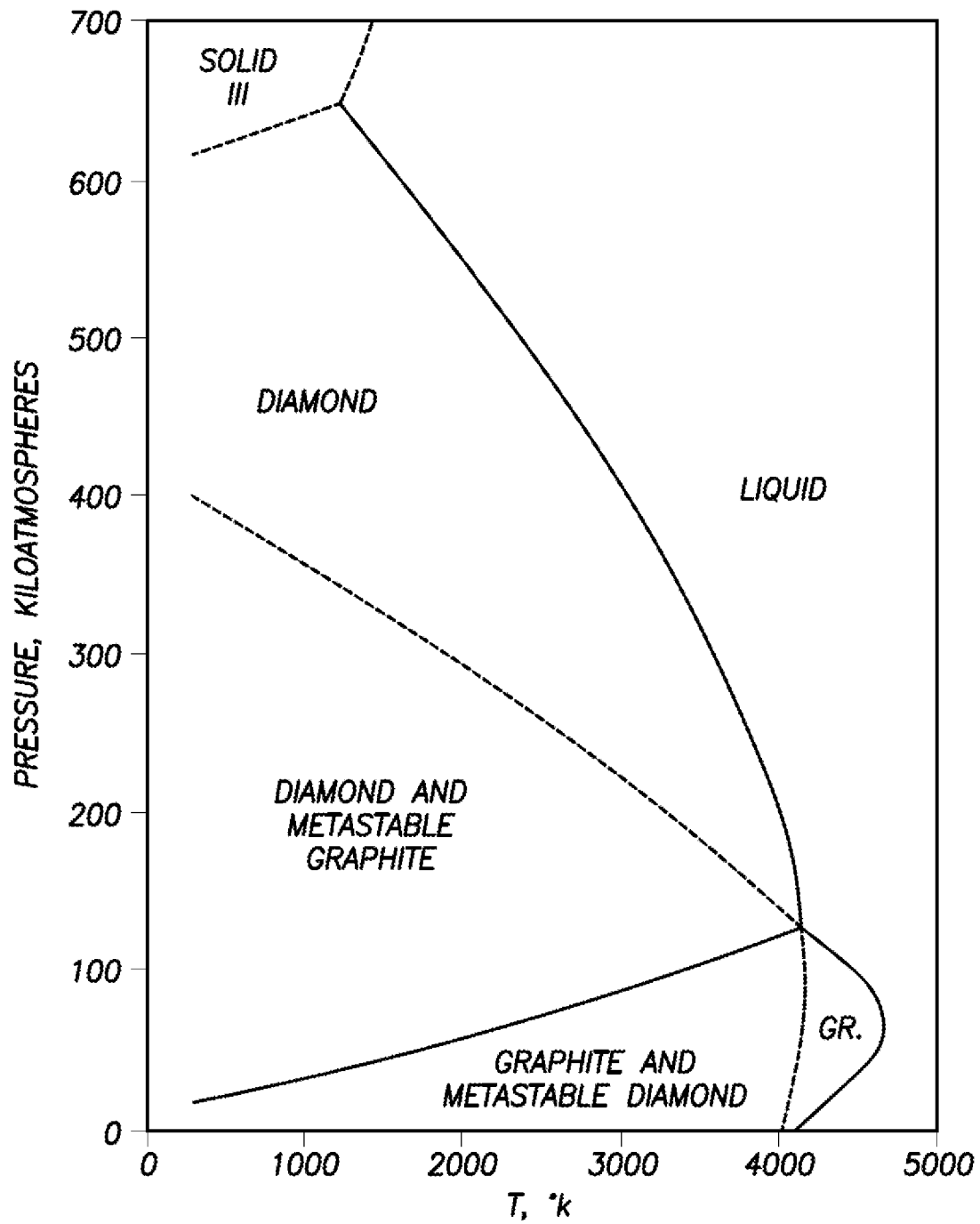
FIG. 9 is a representative phase diagram of diamond components at different temperatures and pressures illustrating conditions in which a diamond material graphitizes.

FIG. 9 is a phase diagram of diamond components at different temperatures and pressures illustrating conditions in which a diamond material graphitizes. Diamond tends to graphitize at temperatures well under 1000 degrees Celsius, which is the minimum liquidus of the braze alloys typically employed in PCD cutter applications. Fortunately, a Silicon carbide Diamond (ScD) material can be used that does not suffer from some of the limitations of PCD. Larger sizes of ScD material can be produced without requiring a substrate (such as WC) containing cobalt. The brazing temperature permitted with ScD is around 1200 degrees C., which is much more readily brazable and offers flexibility in the choice of braze alloys to achieve a robust braze strength between the ScD material and a structure (such as structure 128), The ScD material can also be produced at greater thicknesses at larger diameters than the PCD material. Thus, the thermal stability of an ScD component can offer significant advantages in manufacturing a rotary valve 110 for use in downhole environments.

Silicon Carbide Diamond (ScD) can be made by mixing silicon with diamond prior to hot-pressing. The hot-pressing can be performed at lower pressures using a pressure temperature-time cycle that produces an extensive degree of plastic deformation of the diamond crystals. Mixing a mass of particulate diamond crystals with a bonding agent comprising silicon and subjecting the mixture within a confining space to a temperature in the range of 111.00-1600 degrees Celsius at a pressure in the range of 10 kbars to 40 kbars, and maintaining the temperature and pressure conditions of the mixture for a period of time to cause the silicon in the bonding agent to react with carbon in the diamond crystals to form an interstitial phase of silicon carbide having a melting point above 1600 degrees Celsius. This process can produce a thermally stable diamond compact having a minimum melting point above 1600 degree Celsius and a compressive strength above 10 kbars at ambient temperature.

Figure 10:
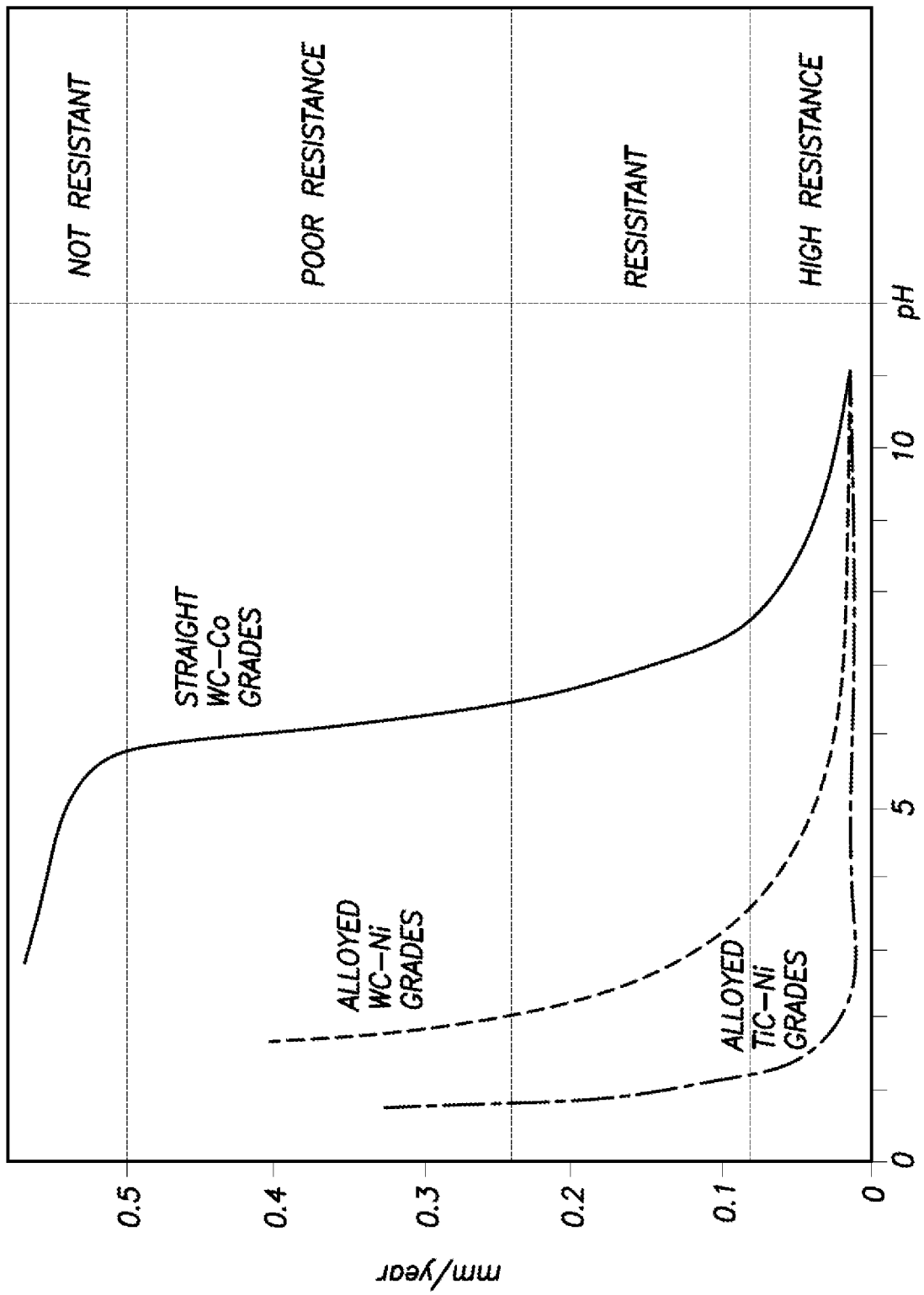
FIG. 10 is a representative chart indicating the corrosion resistance characteristics of non-diamond hard materials in various acidity (pH) solutions.

FIG. 10 is a chart indicating the corrosion resistance characteristics of non-diamond hard materials in various acidity (pH) solutions. As illustrated, straight WC-Cobalt grades of materials have little or no resistance to corrosion in acidic solutions as illustrated by the uppermost curve. As illustrated by the lower two curves, Nickel may be substituted in an alloy for Cobalt to improve the corrosion resistance of an alloy. However, nickel is not a suitable substitute for cobalt, as cobalt is used as a catalyst for binding diamond components (as in a PCD material). An ScD component offers appropriate corrosion resistance properties for high acidity environments, especially since cobalt is not used as a catalyst.

Figure 11:
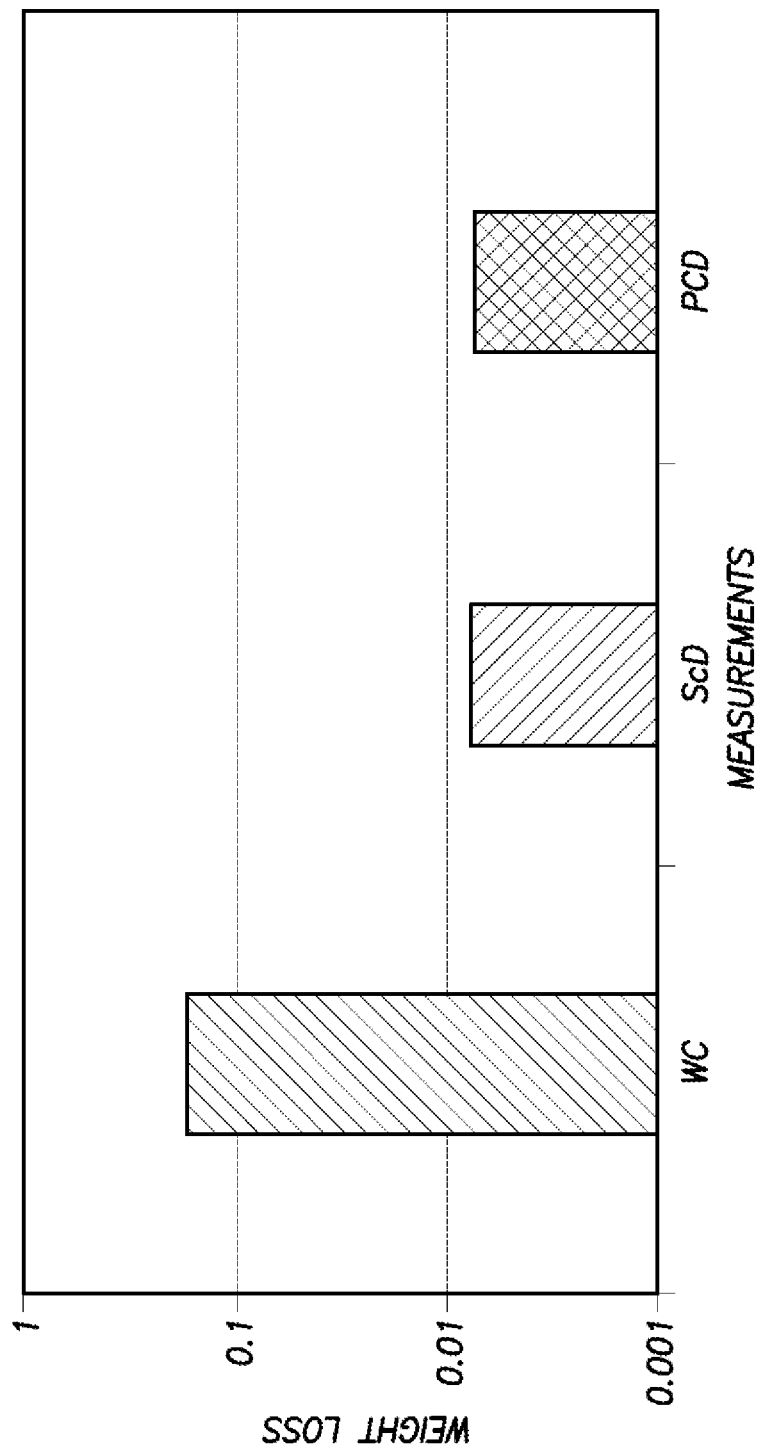
FIG. 11 is a representative graph of abrasion resistance tendencies of Silicon carbide Diamond (ScD)), polycrystalline diamond (PCD) and Tungsten Carbide (WC) components illustrating comparative weight loss measurements of similar components comprising the various materials.

FIG. 11 is a graph of abrasion resistance tendencies of ScD, PCD and WC components illustrating comparative weight loss measurements of similar components comprising the various materials. As illustrated, the abrasive weight loss of an ScD component is comparable to PCI) components and approximately ten times less than that of WC components.

FIG. 12 is a chart of material properties illustrating a comparison of an ScD material with alternative materials including polycrystalline diamond (PCD) and Tungsten Carbide (WC) materials. One notable characteristic is a density of the ScD material, which is significantly lower than the density of tungsten carbide (WC). Thus, components comprising ScD composites may be significantly lighter, and may thus be moved with lower expenditures of energy than similar WC components. Also, the hardness of an ScD composite is comparable to that of PCI) materials, but as described above, ScD materials offer manufacturing options not offered by PCD materials. Therefore, ScD materials are well suited for the manufacture of degradation resistant components of downhole tools 100.

Referring again to FIG. 4, at least one of the generally flat, disc-shaped first and second mating surfaces 138, 132 can comprise an ScD material for inhibiting or resisting degradation of the rotary valve 110 in operation. As illustrated, the rotary actuator 120 can comprise a wear surface 138 of an ScD composite that forms the end 122 (where the end 122 is one layer of thickness "T2" instead of two layers 124, 126 as described above) and is bonded to a support structure 128. The support structure 128 may comprise a material, e.g., WC and/or cemented carbide that is different from the ScD composite end 122. In some embodiments, the ScD composite end 122 can be bonded to the support structure 128 by brazing at brazing temperatures between 650 and 925° C. By employing furnace brazing methods and active brazing alloys, shear strengths of 250 to 350 MPa can be achievable. The ScD composite end 122 is thermally stable, at least in part because the ScD composite end 122 does not contain the interstitial cobalt (Co) catalyst present in sintered PCD. Thus, the thermal degradation due to Co thermal expansion and graphitization does not occur when brazing even at temperatures greater than 700 degrees Celsius, and the rotary actuator 120 remains structurally stable without cracking. In some embodiments, the rotary actuator 120 can comprise a monolithic piece or bonded pieces of an ScD composite.

The rotation of the rotary actuator 120 with respect to the valve seat 130 can cause frictional contact between the engagement surfaces 138, 132. Since the coefficient of friction of an ScD component may be relatively low, rotational movement between the engagement surfaces 138, 132 may be achieved with a relatively low expenditure of energy, and with relatively low abrasive wear.

Figure 13:
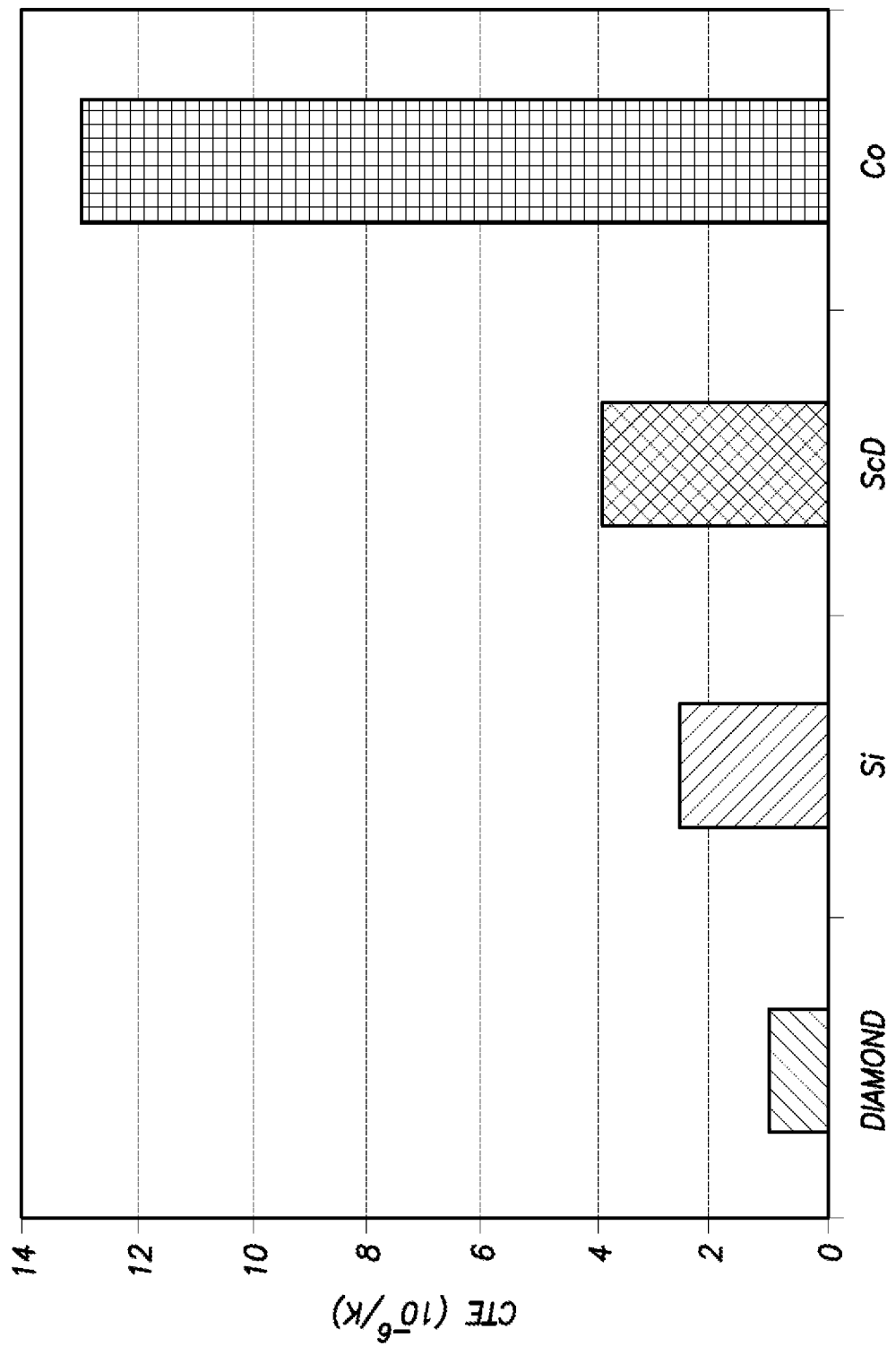
FIG. 13 is a representative graph illustrating the coefficient of thermal expansion of diamond (e.g. PCD and ScD) and various matrix (or binder) materials used in diamond composites.

FIG. 13 is a graph illustrating the coefficient of thermal expansion (CTE) of diamond and substrate materials often associated with diamond composites. Notably, the CTE of silicon (Si and SiC) is much more similar to the CTE of diamond than the CTE of Cobalt (Co) is to the CTE of diamond. Due to the relative similarity, the silicon in an ScD component will expand and contract at a similar rate when subjected to temperature differentials, while the Cobalt in a PDC material will expand and contract at much different rates than the diamond components, which may induce cracking. Thus, ScD components may maintain a relatively robust structural integrity through a brazing process than a similar PCD component.

Figure 14:
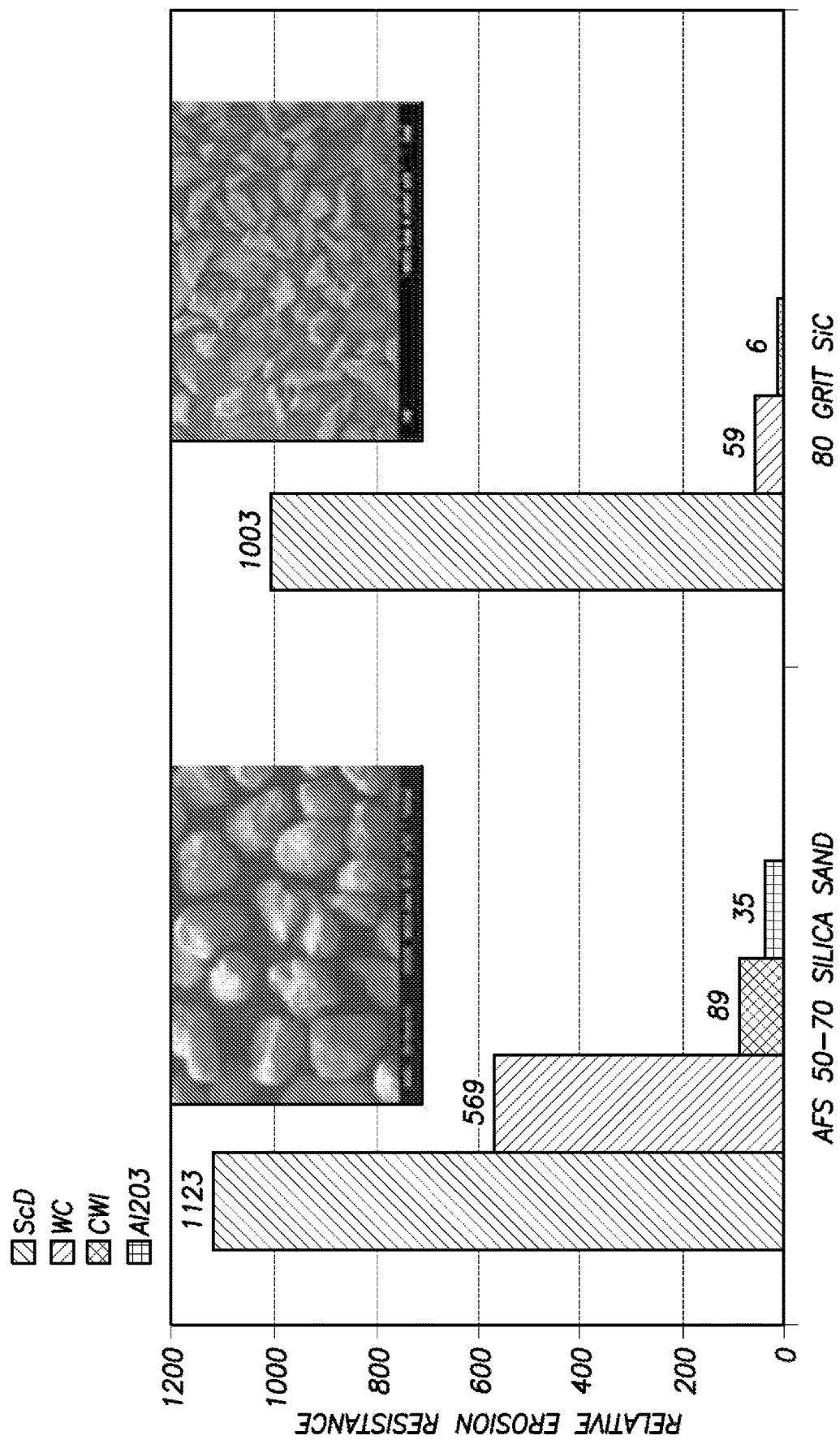
FIG. 14 is a representative graph of erosion resistance characteristics of ScD and various other materials subject to exposure to different types of sand.

FIG. 14 is a graph of erosion resistance characteristics of ScD and various other materials subject to exposure to different types of sand. As illustrated, a finer grit of sand significantly reduces the erosion resistance of WC components as compared to a larger grit sand. However, ScD components maintain a relatively high and relatively consistent corrosion resistance when exposed to various materials.

Referring again to FIG. 4, the valve seat 130 can be fabricated from a monolithic piece or bonded pieces of an ScD composite. The monolithic piece or bonded pieces can be milled to form the ports 140A-c, and the drain port 142. Therefore, the engagement surface 132 and the ports 140A-C, 142 expose the fluid flow through the valve seat 130 to surfaces made of ScD, therefore, they provide significant resistance to degradation to the valve seat 130. The valve seat 130 can also be brazed using standard brazing alloys at standard brazing temperature to provide a superior bond between the valve seat 130 and the manifold 62.

The valve seat 130 of FIG. 6 can also be made from a monolithic piece or bonded pieces of ScD composite. As shown, the valve seat 130 is thicker than the valve seat 130 shown in FIG. 4. Producing this thickness shown in FIG. 6 while maintaining the same outer diameter OD is a beneficial aspect of the ScD composite.

It should also be understood that the ScD composite material also contains a small amount of Silicon Nitride (SiN) that is produced when the silicon is being combined with the diamond particles with trace amounts of nitrogen present. The Silicon (Si) can produce the SiN when the silicon combines with the nitrogen. The presence of the SiN in the ScD composite causes the ScD composite to be electrically conductive with a very low resistivity, thereby, allowing the EDM to mill the ScD composite.

Therefore, a rotary valve 110 is provided, which can include a valve housing 64, a manifold 62 mounted to the valve housing 64, with the manifold 62 having multiple flow paths 84, 86A-C. A rotary actuator 120 can be rotatably mounted within the valve housing 64, with the rotary actuator 120 having a first engagement surface 138, 138A. A valve seat 130 can be fixedly attached or otherwise coupled to the manifold 62, with the valve seat 130 having a second engagement surface 132, 132A that sealingly engages the first engagement surface 138, 138A and can form a seal between the first and second engagement surfaces 138, 132, 138A, 132A. The valve seat 130 can include ports 140A-C, 142 that are in fluid communication with respective ones of the flow paths 84, 86A-C in the manifold 62. The rotary actuator 120 can also include a gap 116 that is selectively aligned and miss-aligned with respective ones of the valve seat ports 140A-C, 142 as the rotary actuator 120 rotates relative to the valve seat 130.

For any of the foregoing embodiments, the rotary valve may include any one of the following elements, alone or in combination with each other:

The valve housing 64 can include inlet ports 87 through a wall of the valve housing 64 that allows pressurized fluid 77 to enter the rotary valve 110. The valve seat ports can include a drain port 142 formed in the center of the valve seat 130, and at least first and second ports 140A, 140B, 140C spaced radially outward from the drain port 142 and circumferentially spaced around the drain port 142. The drain port 142 can be in fluid communication with a center flow path 84 in the manifold 62, and the center flow path 84 can be in fluid communication with a low pressure volume (or annulus) 32. The first port 140A can be in fluid communication with a first actuator 41 through a first flow path 76A in the manifold 62, and the second port 140B can be in fluid communication with a second actuator #2 through a second flow path 76B in the manifold 62. The alignment of the gap 116 with the first port 140A can pressurize the first actuator #1 via the first port 140A and the first flow path 76A, and the alignment of the gap 116 with the first port 140A can align the second port 140B with a recess 118 in the first engagement surface 138A of the rotary actuator 120, wherein the recess 118 fluidicly couples the second port 140B with the drain port 142, which can depressurize the second actuator #2 due to fluid flow 76B through the second flow path 86B, the recess 118, and the center flow path 84.

The alignment of the gap 116 with the second port 140B can pressurize the second actuator #2 via the second port 140B and the second flow path 86B, and the alignment of the gap 116 with the second port 140B can align the first port 140A with a recess 118 in the first engagement surface 138 of the rotary actuator 120, wherein the recess 118 fluidicly couples the first port 140A with the drain port 142, which can depressurize the first actuator 41 due to fluid flow 76A through the first flow path 86A, the recess 118, and the center flow path 84.

The valve seat ports 140A-B further include a third port 140C, wherein the first, second, and third ports 140A-C are spaced radially outward from the drain port 142 and circumferentially spaced around the drain port 142. Alignment of the gap 116 with the third port 140C can pressurize a third actuator #3 via the third port 140C and a third flow path 86C in the manifold 62, and the alignment of the gap 116 with the third port 140O can align at least one of the first and second ports 140A-B with a recess 118 in the first engagement surface 138 of the rotary actuator 120, wherein the recess 118 fluidicly couples the at least one of the first and second ports 140A-B with the drain port 142, which can depressurize a respective at least one of the first and second actuators #1, #2 due to fluid flow 76A, 76B through the recess 118, the center flow path 84, and a respective at least one of the first and second flow paths 86A-B. The low pressure volume can be an annulus 32 in a wellbore 12.

The rotary actuator 120 can include first and second disks 122A-13, wherein the first and second disks 122A-B are connected in a center of each of the first and second disks 122A-B by a structure 128 that extends through a center of the valve seat 130 from the first disk 122A to the second disk 122B, wherein the first disk 122A includes the first engagement surface 138A and the second disk 122B includes a third engagement surface 138B, and wherein the second disk 122B further includes a low pressure port 114 that extends through the second disk 122B. The valve seat 130 can include a fourth engagement surface 132B, wherein the first and second ports 140A-B extend through the valve seat 130 from the second engagement surface 132A to the fourth engagement surface 132B.

The third engagement surface 138B sealing engages the fourth engagement surface 132B and can form a seal between the third and fourth engagement surfaces 138B, 132B.

The gap 116 in the first disk 122A can be aligned with a portion of the third engagement surface 138B of the second disk 122B, where the first and second disks 122A-B rotate together with the rotary actuator 120 as the actuator 120 is rotated relative to the valve seat 130. Rotation of the rotary actuator 120 can selectively align and miss-align the gap 116 with respective ones of the first and second ports 140A-B. The alignment of the gap 116 with the first port 140A can pressurize a first actuator 41 via the first port 140A, and the alignment of the gap 116 with the first port 140A can align the second port 140B with the low pressure port 114 in the second disk 122B and positions the second port 140B in fluid communication with a low pressure volume (or annulus) 32, which depressurizes a second actuator #2 due to fluid flow 76B through a second flow path 86B and the low pressure port 114 to the low pressure volume 32.

Alignment of the gap 116 with the second port 140B can pressurize a second actuator 42 via the second port 140B, and alignment of the gap 116 with the second port 140B can align the first port 140A with the low pressure port 114 in the second disk 122B and position the first port 140A in fluid communication with a low pressure volume 32, which can depressurize a first actuator 41 due to fluid flow 76A through a first flow path 86A and the low pressure port 114 to the low pressure volume 32.

Additionally, a method for steering a drill bit 102 is provided, which can include operations of interconnecting a downhole tool 100 in a drill string 30, where the downhole tool can include multiple actuators 52A-C, and a rotary valve 110, where the rotary valve 110 can include a rotary actuator 120, a valve seat 130, and a manifold 62.

The operations can include pumping drilling mud 36 through the drill string 30 and the downhole tool 100 to a drill bit 102, rotating the downhole tool 100, the valve seat 130, the manifold 62, the actuators 52A-C and the drill bit 102 at a predetermined RPM, and maintaining the rotary actuator 120 in a first azimuthal orientation relative to the wellbore 12 by rotating the rotary actuator 120 at the predetermined RPM in an opposite direction relative to the drill bit 102.

The operations can include applying pressure to a selected one or more of the actuators 52A-C via the rotary valve 110, steering the drill bit 102 toward a second azimuthal orientation away from the center axis X1 of the wellbore 12 in response to the selective application of pressure to the one or more actuators.

For any of the foregoing embodiments, the method may include any one of the following operations, alone or in combination with each other:

The operations can include selecting the one or more actuators 52A-C by determining which of the actuators 52A-C are at a third azimuthal orientation relative to the wellbore 12 as the drill bit 102 is rotated, wherein the application of pressure extends the one or more actuators 52A-C into contact with the wellbore 12 at the third azimuthal orientation. Changing the third azimuthal orientation by rotating the rotary actuator 120 relative to the wellbore 12 and thereby changing the first azimuthal orientation of the rotary actuator 120. The operations can include retracting unselected ones of the actuators 52A-C from contact with the wellbore 12 by releasing pressure through the rotary valve 110 to the annulus 32.

Additionally, a rotary valve 110 with increased resistance to degradation is provided and can include a valve housing 64, a manifold 62 fixedly mounted to the valve housing 64, and a rotary actuator 120 rotatably mounted within the valve housing 64, with the rotary actuator 120 having an end 122 made from Silicon Carbide Diamond (ScD) and the end 122 having a first engagement surface 138. A valve seat 130 can be fixedly attached to the manifold 62, the valve seat 130 having a second engagement surface 132 that sealingly engages the first engagement surface 138.

For any of the foregoing embodiments, the rotary valve 110 may include any one of the following elements, alone or in combination with each other:

The end 122 of the rotary actuator 120 can be brazed to a support structure 128 of the rotary actuator 120 at a temperature greater than 700 degrees Celsius and less than 1200 degrees Celsius. The temperature can also be greater than 650 degrees Celsius and less than 1200 degrees Celsius.

The ScD composite can be made with traces of Silicon Nitride (SiN) which can make the ScD composite electrically conductive. Utilizing the electrical conductivity of the ScD, a recess and/or a gap can be formed in the end 122 of the rotary actuator 120 using an Electrical Discharge Machining (EDM) tool or any other suitable tool for electrically milling the ScD material and structure 128. The ScD can have an increased resistance to degradation relative to the support structure 128. The end 122 and/or the valve seat 130 can be made from the ScD composite material and can have a thickness greater than 2.5 mm and a diameter greater than 30 mm.

The ScD composite material can provide an increased resistance to degradation of the valve seat 130 relative to a resistance of degradation of the manifold 62. The valve seat 130 can be made from a single piece of ScD, where the ScD is electrically conductive, and where ports 140A-C, 142 are formed in the valve seat 130. The valve seat 130 can be brazed to the manifold 62 at a temperature greater than about 700 degrees Celsius and less than about 1200 degrees Celsius. The temperature can also be greater than 650 degrees Celsius and less than 1200 degrees Celsius. The ScD composite material can reduce friction between the first and second engagement surfaces 138, 132.

The manifold 62 can include multiple flow paths 84, 86A-C and the ports 142, 140A-C of the valve seat 130 can be aligned and in fluid communication with respective ones of the flow paths 84, 86A-C in the manifold 62. A gap 116 in the rotary actuator 120 can selectively align and miss-align with respective ones of the valve seat ports 142, 140A-C as the rotary actuator 120 rotates relative to the valve seat 130.

Additionally, a method of manufacturing a rotary valve 110 with increased resistance to degradation is also provided, where the method can include operations of combining diamond particles in a press with silicon as a bonding agent and applying temperature and pressure for a predetermined amount of time to produce a first piece 122 of silicon carbide diamond (ScD) composite. The piece 122 of ScD composite can have a diameter larger than 2.5 mm, and a thickness larger than 2 mm. The piece 122 of ScD composite can also have a diameter larger than 30 mm, and a thickness larger than 2.5 mm. The first piece 122 of the ScD composite (or a first component of the ScD composite) can also be referred to as the end 122 of the rotary actuator 120.

For any of the foregoing embodiments, the method may include any one of the following operations, alone or in combination with each other:

The operations can also include brazing the first piece 122 to a support structure 128 by interposing a compound between the first piece 122 and the support structure 128 and heating the compound to above 700 degrees Celsius and below 1200 degrees Celsius, thereby bonding the first piece to the support structure 128 to produce a rotary actuator 120, with the first piece 122 forming an end 122 of the rotary actuator 120;

The operations can include machining a recess 118 and a gap 116 in the end 12 of the rotary actuator 120 with an Electrical Discharge Machining (EDM) tool;

The operations can include engaging a first engagement surface 138 of the rotary, actuator 120 with a second engagement surface 132 of a manifold 62, the manifold 62 comprising multiple flow paths, thereby forming the rotary valve 120. The engagement surface 132 is shown to be a surface 132 of the valve seat 130 in the FIGS. However, the engagement surface 132 can be a surface on the manifold 62 if the valve seat 130 is formed with the manifold 62 and is not brazed onto the manifold 62, such as when the valve seat 130 is formed separately. If increased resistance to degradation is desired, then the valve seat 130 can be formed separately as an ScD composite component and fixedly attached (e.g. via brazing) to the manifold 62.

The operations can include rotating the rotary actuator 120 relative to the manifold 62, thereby selectively aligning each of the multiple flow paths 84, 86A-C with the gap 116 or the recess 118, thereby selectively allowing fluid communication through the rotary valve 110 with respective ones of the multiple flow paths 84, 86A-C.

The operations can include combining diamond particles in the press with silicon and applying the temperature and pressure for the predetermined amount of time to produce a second piece 130 of ScD composite. The second piece (or second component) can also be referred to as the valve seat 130, since the second piece can form the valve seat 130 when it is attached to the manifold 62.

The operations can include brazing the second piece 130 to the manifold 62, wherein the brazing the second piece 130 can include interposing a compound between the second piece 130 and the manifold 62, and heating the compound above 700 degrees Celsius, thereby bonding the second piece 130 to the manifold 62, with the second piece 130 forming a valve seat 130 of the manifold 62.

The valve seat 130 can include the second engagement surface 132. The valve seat 130 can have an outer diameter greater than 30 mm and a thickness greater than 2.5 mm. The valve seat 130 can also have an outer diameter greater than 25 mm and a thickness greater than 2.0 mm. The temperature can be within a range of 1100 to 1600 degrees Celsius and the pressure is within a range of 10 to 40 kbars.

Additionally, a rotary valve 110 for use in a downhole tool is provided and can include a first component 122 of a rotary actuator 120, with the first component 122 comprising a silicon carbide diamond (ScD) composite, the first component 122 having a first engagement surface 138 and a gap 116 extending therethrough. The first component (or first piece) can be referred to as the end 122 of the rotary actuator 120, A valve seat 130 can define a second engagement surface 132 having a first port 140A extending therethrough, with the second engagement surface 132 engaging the first engagement surface 138. A motor 69 can be operably coupled to the first component 122 and the valve seat 130, wherein the motor 69 selectively moves the first engagement surface 138 relative to the second engagement surface 132 which selectively at least partially aligns the gap 116 and the first port 140A and thereby selectively permits fluid flow through the rotary valve 110.

For any of the foregoing embodiments, the rotary valve 110 may include any one of the following elements, alone or in combination with each other:

The first component 122 can be the shape of a disc, where the first engagement surface 138 is a flat surface defined on the disc. The first component 122 can extend over a diameter of greater than 30 mm with a thickness greater than 2.5 mm. The first component 122 can also extend over a diameter of greater than 25 mm with a thickness greater than 2.0 mm. The first component 122 can be brazed to a support structure 128 comprising a material different from the ScD composite. To braze the first component 122 to the support structure, a braze material can be interposed between the first component 122 and the support structure 128, wherein the braze material (or braze compound) has a melting temperature greater than 700 degrees Celsius and less than 1200 degrees Celsius. The braze material (or braze compound) can also have a melting temperature greater than 650 degrees Celsius and less than 1200 degrees Celsius.

The support structure can comprise a tungsten carbide component (or material) with a threaded drive shaft 68 brazed to the support structure 128 and operably coupled to the motor 69.

The first component 122 and/or the valve seat 130 can be constructed from a monolithic piece of ScD composite. A drain port 142 can be defined in the valve seat 130 and a recess 118 defined in the first component 122, wherein the motor 69 can selectively move the recess 118 relative to the valve seat 130 and selectively fluidly couples the drain port 142 with the first port 140A. The recess 118 can be moved via a coupling with the motor to fluidly couple the first port 140A with the drain port 142 whenever the gap 118 is unaligned with the first port 140A.

The drain port 142 can be disposed radially within the first port 140A and a second port 140B. The drain port 142 can be disposed radially within the first port 140A, the second port 140B and a third port 140C (or more ports). The first port 140A can be aligned with the gap 116 when at least one of the second and third ports 140B, 104C are aligned with the recess 118.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A rotary valve comprising:
a valve housing; wherein the valve housing includes inlet ports through a wall of the valve housing that allows pressurized fluid to enter the rotary valve;
a manifold mounted to the valve housing, with the manifold having multiple flow paths;
a rotary actuator rotatably mounted within the valve housing, with the rotary actuator having a first engagement surface;
a valve seat coupled to the manifold, the valve seat having a second engagement surface that sealingly engages the first engagement surface;
the valve seat further comprising ports that are in fluid communication with respective ones of the flow paths in the manifold; and
the rotary actuator further comprising a gap that selectively aligns and miss-aligns with respective ones of the valve seat ports as the rotary actuator rotates relative to the valve seat.

2. The valve of claim 1, wherein the first engagement surface of the rotary actuator comprises a silicon carbide diamond (ScD) material.

3. The valve of claim 1, further comprising a motor operably coupled to the rotary actuator to rotate the rotary actuator with respect to the valve seat.

4. The valve of claim 1, wherein the valve seat ports include a drain port in fluid communication with a low pressure volume.

5. The valve of claim 4, wherein the drain port is formed in a center of the valve seat and wherein the valve seat ports include at least first and second ports spaced radially outward from the drain port and circumferentially spaced around the drain port.

6. The valve of claim 4, wherein the rotary actuator includes a recess therein, and wherein the rotary actuator is selectively operable to fluidicly couple the drain port with the first and second ports.

7. A rotary valve comprising:
a valve housing;
a manifold mounted to the valve housing, with the manifold having multiple flow paths;
a rotary actuator rotatably mounted within the valve housing, with the rotary actuator having a first engagement surface;
a valve seat coupled to the manifold, the valve seat having a second engagement surface that sealingly engages the first engagement surface;
the valve seat further comprising ports that are in fluid communication with respective ones of the flow paths in the manifold; and
the rotary actuator further comprising a gap that selectively aligns and miss-aligns with respective ones of the valve seat ports as the rotary actuator rotates relative to the valve seat;
wherein the valve seat ports include a drain port disposed in the center of the valve seat, and at least first and second ports spaced radially outward from the drain port and circumferentially spaced around the drain port.

8. The valve of claim 7, wherein the drain port is in fluid communication with a center flow path in the manifold, and the center flow path is in fluid communication with a low pressure volume.

9. The valve of claim 8, wherein the low pressure volume is an annulus in a wellbore.

10. The valve of claim 8, wherein the first port is in fluid communication with a first actuator through a first flow path in the manifold, and the second port is in fluid communication with a second actuator through a second flow path in the manifold.

11. The valve of claim 10, wherein alignment of the gap with the first port pressurizes the first actuator via the first port and the first flow path, and the alignment of the gap with the first port aligns the second port with a recess in the first engagement surface of the rotary actuator, wherein the recess fluidicly couples the second port with the drain port, which depressurizes the second actuator due to fluid flow through the second flow path, the recess, and the center flow path.

12. The valve of claim 10, wherein alignment of the gap with the second port pressurizes the second actuator via the second port and the second flow path, and the alignment of the gap with the second port aligns the first port with a recess in the first engagement surface of the rotary actuator, and wherein the recess fluidicly couples the first port with the drain port, which depressurizes the first actuator due to fluid flow through the first flow path, the recess, and the center flow path.

13. The valve of claim 8, wherein the valve seat ports further include a third port, wherein the first, second, and third ports are spaced radially outward from the drain port and circumferentially spaced around the drain port.

14. The valve of claim 13, wherein alignment of the gap with the third port pressurizes a third actuator via the third port and a third flow path in the manifold, and the alignment of the gap with the third port aligns at least one of the first and second ports with a recess in the first engagement surface of the rotary actuator, wherein the recess fluidicly couples the at least one of the first and second ports with the drain port, which depressurizes a respective at least one of the first and second actuators due to fluid flow through the recess, the center flow path, and a respective at least one of the first and second flow paths.

15. A rotary valve comprising:
a valve housing;
a manifold mounted to the valve housing, with the manifold having multiple flow paths;
a rotary actuator rotatably mounted within the valve housing, with the rotary actuator having a first engagement surface;
a valve seat coupled to the manifold, the valve seat having a second engagement surface that sealingly engages the first engagement surface;
the valve seat further comprising ports that are in fluid communication with respective ones of the flow paths in the manifold; and the rotary actuator further comprising a gap that selectively aligns and miss-aligns with respective ones of the valve seat ports as the rotary actuator rotates relative to the valve seat;

wherein the rotary actuator further comprises first and second disks, wherein the first and second disks are connected in a center of each of the first and second disks by a structure that extends through a center of the valve seat from the first disk to the second disk, wherein the first disk includes the first engagement surface and the second disk includes a third engagement surface, and wherein the second disk further includes a low pressure port that extends through the second disk.

16. The valve of claim 15, wherein the valve seat includes a fourth engagement surface, wherein the first and second ports extend through the valve seat from the second engagement surface to the fourth engagement surface.

17. The valve of claim 16, wherein the third engagement surface sealingly engages the fourth engagement surface.

18. The valve of claim 17, wherein the gap in the first disk is aligned with a portion of the third engagement surface of the second disk, and wherein the first and second disks rotate together as the rotary actuator is rotated relative to the valve seat.

19. The valve of claim 18, wherein rotation of the rotary actuator selectively aligns and miss-aligns the gap with respective ones of the first and second ports.

20. The valve of claim 19, wherein alignment of the gap with the first port pressurizes a first actuator via the first port, and wherein the alignment of the gap with the first port aligns the second port with the low pressure port in the second disk and positions the second port in fluid communication with a low pressure volume, which depressurizes a second actuator due to fluid flow through a second flow path and the low pressure port to the low pressure volume.

21. The valve of claim 19, wherein alignment of the gap with the second port pressurizes a second actuator via the second port, and wherein the alignment of the gap with the second port aligns the first port with the low pressure port in the second disk and positions the first port in fluid communication with a low pressure volume, which depressurizes a first actuator due to fluid flow through a first flow path and the low pressure port to the low pressure volume.

* * * * *

UNITED STATES PATENT AND TRADEMARK OFFICE
CERTIFICATE OF CORRECTION

PATENT NO. : 11,008,810 B2
APPLICATION NO. : 16/342188
DATED : May 18, 2021
INVENTOR(S) : Daniel Winslow, Larry Chambers and Neelesh Deolalikar It is certified that error appears in the above-identified patent and that said Letters Patent is hereby corrected as shown below:

In the Specification

Column 4, Line 11, change "FWD" to -- LWD --

Column 5, Line 22, change "AU" to -- All --

Column 6, Line 11, change "beating" to -- bearing --

Column 7, Line 38, change "HO" to -- 110 --

Column 7, Line 45, change "PCI" to -- PCD --

Column 8, Line 9, change "43" to -- #3 --

Column 10, Line 34, change "41, #2, 43" to -- #1, #2, #3 --

Column 13, Line 1, change "PCI" to -- PCD --

Column 13, Line 12, change "PCI" to -- PCD --

Column 14, Line 21, change "111.00-1600" to -- 1100-1600 --

Column 14, Line 49, change "PCI" to -- PCD --

Column 14, Line 61, change "PCI" to -- PCD --

Column 16, Line 45, change "41" to -- #1 --

Column 16, Line 65, change "41" to -- #1 --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,008,810 B2

Column 17, Line 8, change "1400" to -- 140C --

Column 17, Line 20, change "122A-13" to -- 122A-B --

Column 17, Line 33, change "sealing" to -- sealingly --

Column 17, Line 45, change "41" to -- #1 --

Column 17, Line 53, change "1408" to -- 140B --

Column 17, Line 54, change "42" to -- #2 --

Column 17, Line 59, change "41" to -- #1 --

Column 19, Line 23, change "2.5" to -- 25 --

Column 19, Line 42, change "12" to -- 122 --